(12) United States Patent
Weber et al.

(10) Patent No.: US 6,413,309 B1
(45) Date of Patent: Jul. 2, 2002

(54) PIGMENT PREPARATIONS COMPRISING TWO OR MORE PERYLENE COMPOUNDS

(75) Inventors: Joachim Weber, Frankfurt; Manfred Urban, Wiesbaden; Manfred Opravil, Karben; Erwin Dietz, Koenigstein, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/491,318

(22) Filed: Jan. 25, 2000

(30) Foreign Application Priority Data

Jan. 26, 1999 (DE) .......................... 199 02 907

(51) Int. Cl.⁷ .................. C09B 67/20; C04B 16/00; C07D 40/00; C08K 5/04
(52) U.S. Cl. .................. 106/493; 106/413; 106/476; 106/494; 106/495; 106/496; 106/497; 106/498
(58) Field of Search .................. 106/413, 476, 106/493, 494, 495, 496, 497, 498

(56) References Cited

U.S. PATENT DOCUMENTS

| | | | |
|---|---|---|---|
| 4,310,359 A | 1/1982 | Ehashi et al. | 106/498 |
| 4,599,408 A | 7/1986 | Spietschka et al. | 544/125 |
| 4,762,569 A | 8/1988 | Miki et al. | 106/476 |
| 4,986,852 A | 1/1991 | Dietz et al. | 106/498 |
| 5,248,774 A * | 9/1993 | Dietz et al. | 544/125 |
| 5,264,032 A | 11/1993 | Dietz et al. | 106/411 |
| 5,264,034 A | 11/1993 | Dietz et al. | 106/493 |
| 5,466,807 A | 11/1995 | Dietz et al. | 546/6 |
| 5,472,494 A * | 12/1995 | Hetzenegger et al. | 106/493 |
| 5,958,129 A | 9/1999 | Urban et al. | 106/498 |
| 6,036,766 A | 3/2000 | Hendi et al. | 106/494 |
| 6,066,202 A | 5/2000 | Wallquist et al. | 106/494 |

FOREIGN PATENT DOCUMENTS

| | | |
|---|---|---|
| DE | A 31 06 906 | 1/1982 |
| DE | 197 09 798 | 9/1998 |
| EP | A 0 321 919 | 6/1989 |
| EP | 0 485 441 B1 | 5/1992 |
| EP | 0 864 613 A2 | 9/1998 |
| EP | 937724 * | 8/1999 |

OTHER PUBLICATIONS

English Translation for Japan Patent No. 3–26767 (Feb. 1991).
Translator's Report/Comments for JP–A–91–26767 (no date).
esp@cenet patent for EP0486531 (May 1992).

* cited by examiner

Primary Examiner—Anthony Green
(74) Attorney, Agent, or Firm—Susan S. Jackson; Scott E. Hanf

(57) ABSTRACT

Pigment preparations comprising
  a) at least one organic base pigment,
    b1) at least one perylene pigment dispersant of the formula (I)

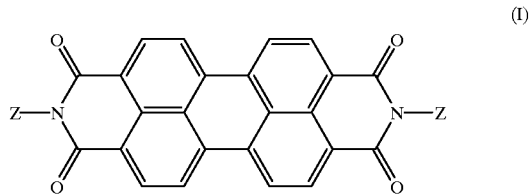

(I)

and
    b2) at least one acidic, carboxyl- or sulfo-containing perylene pigment dispersant have advantageous rheological and coloristic properties.

20 Claims, No Drawings

PIGMENT PREPARATIONS COMPRISING TWO OR MORE PERYLENE COMPOUNDS

FIELD OF THE INVENTION

The present invention relates to novel pigment preparations having improved coloristic and rheological properties and to their preparation and use for pigmenting high molecular mass materials.

DESCRIPTION OF THE RELATED ART

Pigment preparations are combinations of pigments with pigment dispersants that are structurally analogous to pigments and are substituted by groups having a specific activity. They are added to the pigments in order to facilitate dispersion in the application media, especially in varnishes, and to improve the rheological and coloristic properties of the pigments. The viscosity of the highly pigmented paint concentrates (millbase) is lowered and the flocculation of the pigment particles is lessened. By this means it is possible, for example, to increase the transparency and the gloss. This is a particular requirement in the case of metallic pigments.

A large number of proposals exist for improving the rheological and coloristic properties of organic pigments by adding pigment dispersants, although not always with the desired result. EP-A-0 321 919 describes the production of pigment preparations by mixing the base pigments with pigment derivatives that contain methyleneimidazolyl groups. In the field of perylene pigments, this results in pigment preparations whose coloristic properties no longer meet current requirements.

DE-A-3 106 906 describes the preparation of pigment dispersants that contain sulfonamide groups. The pigment dispersants described therein are based on perylene compounds but have considerable coloristic and rheological deficiencies.

DE-A-1 97 09 798 discloses pigment preparations comprising asymmetric, and U.S. Pat. No. 4 762 569 the production of pigment preparations based on symmetric, perylene-3,4,9,10-tetracarboxylic diimides. These pigment preparations are in many cases suitable only for use in solventborne systems. Also, they do not meet all of the requirements made of them in terms of rheological and coloristic properties. Especially at high levels of pigment dispersant, the coloristic properties are no longer adequate, and in many cases a distinct loss of gloss and a deviation in shade can be noted. Moreover, these pigment dispersants possess inadequate solvent fastness and fastness to overcoating, thus greatly restricting their universal application. Furthermore, in many varnish systems it is possible to observe instances of incompatibility with the binder.

EP-A-0 485 441 describes the production of pigment preparations based on acidic perylene-3,4,9,10-tetracarboxylic diimides. However, these pigment preparations do not meet all of the requirements made of them in terms of rheological and coloristic properties. When acidic perylene compounds are used in aqueous coating systems, which are often of alkaline pH, there may be problems, thus restricting their universal application.

SUMMARY OF THE INVENTION

A need for improvement existed and the object was therefore to provide pigment preparations which overcome the abovementioned disadvantages of the prior art in terms of coloristics, rheology, and universal applicability.

It has been found that the object is surprisingly achieved by pigment preparations which in addition to the base pigments comprise a combination of at least two specific perylene-3,4,9,10-tetracarboxylic diimides.

The invention provides pigment preparations comprising
a) at least one organic base pigment,
b1) at least one pigment dispersant of the formula (I),

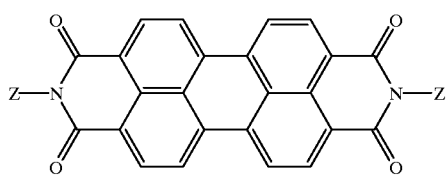

(I)

in which the two radicals Z are identical or different and Z has the definition $Z^1$, $Z^2$, $Z^3$ or $Z^4$, with the proviso that both radicals Z are not simultaneously $Z^4$, and in which
$Z^1$ is a radical of formula (Ia),

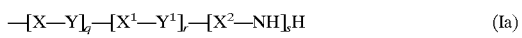

(Ia)

in which
X, $X^1$ and $X^2$ are identical or different and are a branched or unbranched $C_2$–$C_6$-alkylene radical or a $C_5$–$C_7$-cycloalkylene radical which can be substituted by 1 to 4 $C_1$–$C_4$-alkyl radicals, hydroxyl radicals, hydroxyalkyl radicals having 1 to 4 carbon atoms, and/or by 1 or 2 further $C_5$–$C_7$-cycloalkyl radicals;
Y and $Y^1$ are identical or different and are an NH, —O or N($C_1$–$C_6$-alkyl) group, preferably —NCH$_3$, or

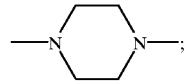

q is a number from 1 to 6, preferably 1, 2, 3 or 4;
r and s independently of one another are a number from 0 to 6, preferably 0, 1 or 2, r and s not simultaneously being zero; and in which
$Z^2$ is a radical of formula (Ib),

(Ib)

in which
$q_1$ is a number from 0 to 6, preferably 0, 1, 2, 3 or 4;
and in which
$Z^3$ is a radical of formula (Ic),

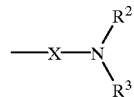

(Ic)

in which
$R^2$ and $R^3$ independently of one another are a hydrogen atom, a substituted or unsubstituted or partly fluorinated or perfluorinated alkyl group having 1 to 20 carbon atoms, or a substituted or unsubstituted or partly fluorinated or perfluorinated alkenyl group having 2 to 20 carbon atoms, the substituents being able to be hydroxyl, phenyl, cyano, chloro, bromo, $C_2$–$C_4$-acyl or $C_1$–$C_4$-alkoxy and preferably from 1 to 4 in number, or $R^2$ and $R^3$ together with the nitrogen atom, form a saturated, unsaturated or aromatic heterocyclic ring with or without a further nitrogen, oxygen or sulfur atom in the ring; and X is as defined above;

$Z^4$ is hydrogen, hydroxyl, amino, phenyl or $C_1$–$C_{20}$-alkyl, the phenyl ring and the alkyl group being able to be substituted by one or more, e.g. 1, 2, 3 or 4, substituents from the group consisting of Cl, Br, CN, OH, $C_6H_5$, carbamoyl, $C_2$–$C_4$-acyl and $C_1$–$C_4$-alkoxy, such as methoxy or ethoxy, and the phenyl ring also being able to be substituted by $NR^2R^3$, where $R^2$ and $R^3$ are as defined above, or the alkyl group is perfluorinated or partly fluorinated;

b2) at least one pigment dispersant of the formula (II),

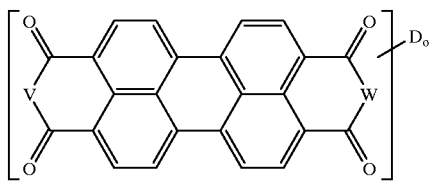

(II)

in which

V is a bivalent radical —O—, >$NR^4$, or >N—$R^5$—$Y^-$ $X^+$, and

W is the bivalent radical >N—$R^5$—$Y^-X^+$,

D is a chlorine or bromine atom and, if o >1, may be a combination thereof, and o is a number from 0 to 4;

$R^4$ is a hydrogen atom or a $C_1$–$C_{20}$-alkyl group, especially $C_1$–$C_4$-alkyl, or is a phenyl group which can be unsubstituted or substituted one or more times, e.g., 1, 2 or 3 times, by halo such as chloro or bromo, $C_1$–$C_4$-alkyl such as methyl or ethyl, $C_1$–$C_4$-alkoxy such as methoxy or ethoxy, or phenylazo, $R^5$ is a $C_1$–$C_{18}$-alkylene group which can be interrupted one or more times within the C—C-chain by a bridge member from the series consisting of —O—, —$NR^6$, —S—phenylene, —CO—, —$SO_2$—, or —$CR^7R^8$ or a chemically logical combination thereof, in which $R^6$, $R^7$ and $R^8$ independently of one another are each a hydrogen atom or a $C_1$–$C_4$-alkyl group which can be unsubstituted or substituted by a heterocyclic radical, preferably imidazole or piperazine, but in particular is a straight-chain or branched $C_1$–$C_6$-alkylene group such as ethylene or propylene; or is a phenylene group which can be unsubstituted or substituted one or more times, e.g., 1, 2 or 3 times, by $C_1$–$C_4$-alkyl such as methyl or ethyl, or $C_1$–$C_4$-alkoxy such as methoxy or ethoxy, $Y^-$ is one of the anionic radicals —$SO_3^-$ or $COO^-$, and $X^+$ is $H^+$ or the equivalent $$\frac{M^{m+}}{m}$$

of a metal cation $M^{m+}$ from main groups 1 to 5 or from transition groups 1 or 2 or 4 to 8 of the Periodic Table of the Chemical Elements, m being one of the numbers 1, 2 and 3, and $M^{m+}$ defining, for example, $Li^{1+}$, $Na^{1+}$, $K^{1+}$, $Mg^{2+}$, $Ca^{2+}$, $Sr^{2+}$, $Ba^{2+}$, $Mn^{2+}$, $Cu^{2+}$, $Ni^{2+}$, $Co^{2+}$, $Zn^{2+}$, $Fe^{2+}$, $Al^{3+}$, $Cr^{3+}$ or $Fe^{3+}$;

or an ammonium ion $N^+R^9R^{10}R^{11}R^{12}$, in which the substituents $R^9$, $R^{10}$, $R^{11}$ and $R^{12}$ independently of one another are each a hydrogen atom, $C_1$–$C_{30}$-alkyl, $C_1$–$C_{30}$-alkenyl, $C_5$–$C_{30}$-cycloalkyl, unsubstituted or $C_1$–$C_8$-alkyl-substituted phenyl, ($C_1$–$C_4$)-alkylene-phenyl, preferably benzyl, or are a (poly)alkyleneoxy group of the formula —[$CH(R^{80})$—$CH_2$—O]$_k$—H in which k is a number from 1 to 30 and $R^{80}$ is hydrogen, $C_1$–$C_4$-alkyl or, if k>1, is a combination thereof;

and in which alkyl, alkenyl, cycloalkyl, phenyl or alkylphenyl $R^9$, $R^{10}$, $R^{11}$, and/or $R^{12}$ can be further substituted by amino, hydroxyl, and/or carboxyl; or in which the substituents $R^9$ and $R^{10}$, together with the quaternary nitrogen atom, can form a five- to seven-membered saturated ring system comprising if desired further heteroatoms from the group consisting of O, S and N, an example of such a ring system being pyrrolidone, imidazolidine, hexamethyleneimine, piperidine, piperazine or morpholine;

or in which the substituents $R^9$, $R^{10}$, and $R^{11}$, together with the quaternary nitrogen atom, can form a five- to seven-membered aromatic ring system comprising if desired further heteroatoms from the group consisting of O, S and N and onto which, if desired, additional rings are fused, an example of such a ring system being pyrrole, imidazole, pyridine, picoline, pyrazine, quinoline or isoquinoline; with the exception of a pigment preparation comprising an organic base pigment, a pigment dispersant of the formula (IX)

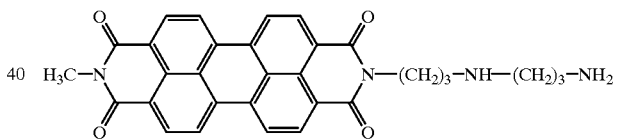

(IX)

and a pigment dispersant of the formula (X)

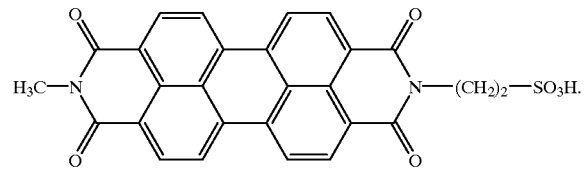

(X)

Depending on the selection of the radicals Z, symmetric or asymmetric pigment dispersants of the formula (I) are obtained, asymmetric pigment dispersants of the formula (I) including those having different radicals $Z^1$, $Z^2$ and/or $Z^3$.

DESCRIPTION OF THE PREFERRED EMBODIMENTS

Examples of pigment dispersants of interest are those of the formula (I), in which X, $X^1$ and $X^2$ are a $C_2$–$C_4$-alkylene radical or cyclohexylene.

Examples of pigment dispersants of particular interest are those of the formula (I), in which $Z^1$ has one of the following definitions: —[(CH$_2$)$_3$—NH]$_2$—H, —(CH$_2$—CH$_2$—NH)$_2$H,

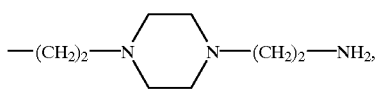

—(CH$_2$)$_3$—NH—(CH$_2$)$_2$—NH—(CH$_2$)$_3$—NH$_2$,

—(CH$_2$)$_3$—N(CH$_3$)—(CH$_2$)$_3$—NH$_2$, —(CH$_2$)$_3$—O—(CH$_2$)$_2$—O—(CH$_2$)$_3$—NH$_2$,

—(CH$_2$)$_3$—O—(CH$_2$)$_3$—O—(CH$_2$)$_3$—NH$_2$, —(CH$_2$)$_2$—NH—(CH$_2$)$_3$—NH$_2$, —(CH$_2$)$_3$—NH—(CH$_2$)$_2$—NH$_2$,

—(CH$_2$—CH$_2$—NH)$_3$—H, —(CH$_2$—CH$_2$—NH)$_4$—H, —(CH$_2$—CH$_2$—NH)$_5$—H,

—(CH$_2$)$_3$—O—(CH$_2$)$_2$—O—(CH$_2$)$_2$—O—(CH$_2$)$_3$—NH$_2$, —(CH$_2$)$_3$—O—(CH$_2$)$_4$—O—(CH$_2$)$_3$—NH$_2$,

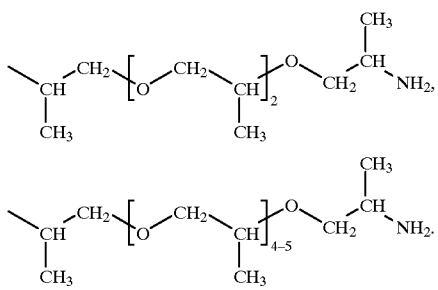

Examples of pigment dispersants of interest are those of the formula (I), in which $Z^2$ has one of the definitions —(CH$_2$)2—OH, —(CH$_2$)$_3$—OH, —CH$_2$—CH(CH$_3$)—OH, —CH(CH$_2$—CH$_3$)CH$_2$—OH, —CH(CH$_2$OH)$_2$, —(CH$_2$)$_2$—O—(CH$_2$)$_2$—OH or —(CH$_2$)$_3$—O—(CH$_2$)$_2$—O—(CH$_2$)$_2$—OH.

Examples of pigment dispersants of interest are those of the formula (I) in which $R^2$ and $R^3$ independently of one another are a hydrogen atom, a $C_1$–$C_6$-alkyl group, a $C_1$–$C_6$-alkyl group substituted by 1 or 2 substituents from the group consisting of hydroxyl, acetyl, methoxy, ethoxy, chloro and bromo, or $R^2$ and $R^3$, together with the adjacent nitrogen atom, form an imidazolyl, piperidyl, morpholinyl, pipecolinyl, pyrrolyl, pyrrolidinyl, pyrazolyl or piperazinyl ring.

Examples of pigment dispersants of particular interest are those of the formula (I) in which $Z^3$ has one of the definitions —(CH$_2$)$_2$—NH$_2$, —(CH$_2$)$_3$—NH$_2$, —CH$_2$—CH(CH$_3$)—NH$_2$,

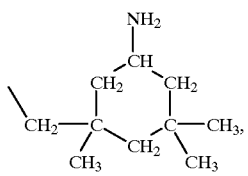

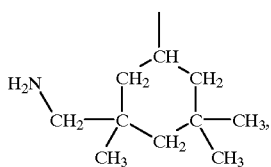

—(CH$_2$)$_2$—NH—CH$_3$, —(CH$_2$)$_2$—N(CH$_3$)$_2$, —(CH$_2$)$_2$—NH—CH$_2$—CH$_3$, —(CH$_2$)$_2$—N(CH$_2$—CH$_3$)$_2$, —(CH$_2$)$_3$—NH—CH$_3$, —(CH$_2$)$_3$—N(CH$_3$)$_2$, —(CH$_2$)$_3$—NH—CH$_2$—CH$_3$ or —(CH$_2$)$_3$—N(CH$_2$—CH$_3$)$_2$.

Examples of pigment dispersants of interest are those of the formula (I), in which $Z^4$ is hydrogen, amino, phenyl, benzyl, $NR^2R^3$-substituted phenyl or benzyl, $C_1$–$C_6$-alkyl or $C_2$–$C_6$-alkyl substituted by 1 or 2 substituents from the group consisting of hydroxyl, acetyl, methoxy and ethoxy, with particular preference hydrogen,

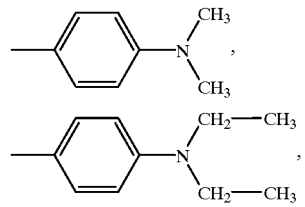

methyl, ethyl, propyl, butyl, benzyl, hydroxyethyl, hydroxypropyl or methoxypropyl.

The perylene compounds of the formulae (I) and (II) that are used in accordance with the invention as pigment dispersant b) can be prepared, for example, in accordance with DE-A-3 017 185 or EP-A-0 486 531 by reacting perylene-3,4,9,10-tetracarboxylic monoanhydride monoimides of the formula (IV)

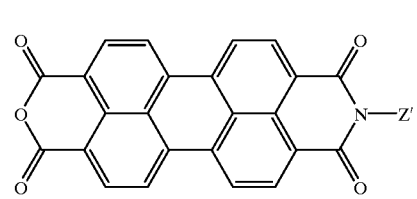

(IV)

with one or more, preferably 1 or 2, amines of the formula (V)

H$_2$N—Z' (V)

in which Z' in formula (IV) and Z' in formula (V) can be identical or different and have the definition of Z or of $R^4$ or $R^5$—Y$^-$X$^+$, or by reacting perylene-3,4,9,10-tetracarboxylic dianhydride of the formula (VI)

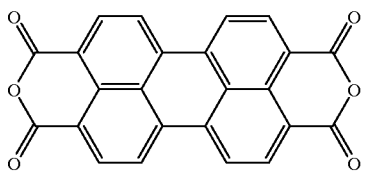
(VI)

with one or more, preferably 1 or 2, amines of the formula (V).

The reaction can be conducted in an aqueous, organic or aqueous-organic medium at temperatures, for example, of up to 250° C., preferably up to 180° C. Suitable organic media include inert organic solvents, preferably those whose boiling point is above that of water, examples being DMSO, chlorobenzene, dichlorobenzenes, trichlorobenzenes, relatively high-boiling alcohols, carboxamides, quinoline, imidazole, naphthalene, phenol and relatively high-boiling ethers. The amines of the formula (V) may also serve simultaneously as solvents. The pH of the aqueous or aqueous-organic medium can be acidic, neutral or alkaline, preferably between pH 3 and 14. It is also possible to use different amines at the same time in order to prepare mixtures of pigment dispersants of the formula (I) or of the formula (II).

The condensation is conducted with particular preference in aqueous solution under alkaline pH conditions at temperatures in the range between 50 and 180° C. In the condensation it is judicious to use the amines in excess, judiciously in a molar excess up to 8 times, preferably up to 4 times. The products of the formula (I) formed are isolated from the reaction mixture preferably by filtration.

Examples of compounds which can be used as amines of the formula (V) are taurine (2-aminoethanesulfonic acid), β-alanine, 4-aminobutyric acid, ammonia, methylamine, ethylamine, n-propylamine, n-butylamine, n-hexylamine, β-hydroxyethylamine, β- or γ-hydroxypropylamine, hydroxylamine, hydrazine, N,N-dimethyl-p-phenylenediamine, dimethylaminomethylamine, diethylaminoethylamine, 2-ethylhexylaminoethylamine, stearylaminoethylamine, oleylaminoethylamine, dimethylaminopropylamine, diethylaminopropylamine, dibutylaminopropylamine, diethylaminobutylamine, dimethylaminoamylamine, diethylaminohexylamine, piperidinomethylamine, piperidinoethylamine, piperidinopropylamine, pipecolinoethylamine, pipecolinopropylamine, imidazolopropylamine, morpholinoethylamine, morpholinopropylamine, piperazinoethylamine, 2-(2-aminoethoxy)ethanol, 2-(2-(3-aminopropoxy)ethoxy)ethanol, 3,3'-oxybis(ethyleneloxy) bis(propylamine), ethylenediamine, 1,2-propanediamine, 1,3-propanediamine, 2,2-dimethyl-1,3-propanediamine, isophoronediamine, diethylenetriamine, triethylenetetramine, tetraethylenepentamine, pentaethylenehexamine, dipropylenetriamine, N,N-bis(3-aminopropyl)methylamine, tripropylenetetramine, (3-(2-aminoethyl)aminopropylamine, (N,N'-bis-(3-aminopropyl) ethylenediamine), 4,7-dioxadecane-1,10-diamine, 4,9-dioxadodecane-1,12-diamine, 5-amino-1,3,3-trimethylcyclohexanemethaneamine or 1,4-bis(3-aminopropoxy)butane.

The term base pigment refers to organic pigments, or mixtures of organic pigments, which may also be in the form of conventional pigment preparations. Suitable base pigments for producing the pigment preparations of the invention are, for example, perylene, perinone, quinacridone, quinacridonequinone, anthraquinone, anthanthrone, benzimidazolone, disazo condensation, azo, indanthrone, phthalocyanine, triarylcarbonium, dioxazine, aminoanthraquinone, diketopyrrolopyrrole, thioindigo, isoindoline, isoindolinone, pyranthrone, isoviolanthrone and carbon black pigments or mixtures thereof. It is also possible to use more than one base pigment.

Examples of preferred base pigments for the purposes of the present invention are C.I. Pigment Red 123 (C.I. No. 71145), C.I. Pigment Red 149 (C.I. No. 71137), C.I. Pigment Red 178 (C.I. No. 71 155), C.I. Pigment Red 179 (C.I. No. 71 130), C.I. Pigment Red 190 (C.I. 71 140), C.I. Pigment Red 224 (C.I. No. 71 127), C.I. Pigment Violet 29 (C.I. No. 71 129), C.I. Pigment Orange 43 (C.I. No. 71 105), C.I. Pigment Red 194 (C.I. No. 71 100), C.I. Pigment Violet 19 (C.I. No. 73 900), C.I. Pigment Red 122 (C.I. No. 73 915), C.I. Pigment Red 192, C.I. Pigment Red 202 (C.I. No. 73 907), C.I. Pigment Red 207, C.I. Pigment Red 209 (C.I. No. 73 905), C.I. Pigment Red 206 (C.I. No. 73 900173 920), C.I. Pigment Orange 48 (C.I. No. 73 900/73 920), C.I. Pigment Orange 49 (C.I. No. 73 900/73 920), C.I. Pigment Orange 42, C.I. Pigment Yellow 147, C.I. Pigment Red 168 (C.I. No. 59 300), C.I. Pigment Yellow 120 (C.I. No. 11 783), C.I. Pigment Yellow 151 (C.I. No.13 980), C.I. Pigment Brown 25 (C.I. No. 12 510), C.I. Pigment Violet 32 (C.I. No. 12 517), C.I. Pigment Orange 64; C.I. Pigment Brown 23 (C.I. No. 20 060), C.I. Pigment Red 166 (C.I. No. 20 730), C.I. Pigment Red 170 (C.I. No.12 475), C.I. Pigment Orange 38 (C.I. No. 12 367), C.I. Pigment Red 188 (C.I. No. 12 467), C.I. Pigment Red 187 (C.I. No. 12 486), C.I. Pigment Orange 34 (C.I. No. 21 115), C.I. Pigment Orange 13 (C.I. No. 21 110), C.I. Pigment Red 9 (C.I. No. 12 460), C.I. Pigment Red 2 (C.I. No.12 310), C.I. Pigment Red 112 (C.I. No. 12 340), C.I. Pigment Red 7 (C.I. No. 12 420), C.I. Pigment Red 210 (C.I. No. 12 477), C. 1. Pigment Red 12 (C.I. No. 12 385), C.I. Pigment Blue 60 (C.I. No. 69 800), C.I. Pigment Green 7 (C.I. No. 74 260),C.I. Pigment Green 36 (C.I. No. 74 265); C.I. Pigment Blue 15:1,15:2, 15:3, 15:4, 15:6 and 15 (C.I. No. 74 160); C.I. Pigment Blue 56 (C.I. No. 42 800), C.I. Pigment Blue 61 (C.I. No. 42 765:1), C.I. Pigment Violet 23 (C.I. No. 51 319), C.I. Pigment Violet 37 (C.I. No. 51 345), C.I. Pigment Red 177 (C.I. No. 65 300), C.I. Pigment Red 254 (C.I. No. 56 110), C.I. Pigment Red 255 (C.I. No. 56 1050), C.I. Pigment Red 264, C.I. Pigment Red 270, C.I. Pigment Red 272 (C.I. No. 56 1150), C.I. Pigment Red 71, C.I. Pigment Orange 73, C.I. Pigment Red 88 (C.I. No. 73 312).

The amount of the pigment dispersants b1) of the formula (I) and of the pigment dispersants b2) of the formula (II) in the pigment preparations of the invention can vary within wide limits provided there is no adverse effect on the target pigment quality; nevertheless, the amount of a mixture of the pigment dispersants b1) and b2) is generally from 1 to 40% by weight, preferably from 2 to 30% by weight, based on the weight of the base pigment.

The quantitative ratios between the pigment dispersant of b1) and b2) can lie, for example, between 1:10 and 10:1 parts by weight, preferably between 1:5 and 5:1 parts by weight, in particular between 1:3 and 3:1 parts by weight.

In addition to the base pigment, the pigment dispersant b1) and the pigment dispersant b2), the pigment preparations of the invention may also comprise further customary additives, such as, for example, fillers, standardizers, surfactants, resins, defoamers, antidusting agents, extenders, shading colorants, preservatives, or drying retardants.

Preferred pigment preparations in the context of the present invention consist essentially of a) from 40 to 99% by weight, preferably from 60 to 98% by weight, of at least one base pigment a), b) from 1 to 40% by weight, preferably from 2 to 30% by weight, of a mixture of at least one, preferably 1, 2 or 3, pigment dispersants b1) of the formula (I) and at least one, preferably 1, 2 or 3, pigment dispersants b2) of the formula (II), c) from 0 to 20% by weight, preferably from 0.1 to 15% by weight, of surfactants, and d) from 0 to 20% by weight, preferably from 0.1 to 10% by weight, of other customary additives, the proportions of the respective components being based on the total weight of the preparation (100% by weight).

Suitable surfactants include customary anionic, cationic or nonionic surfactants or mixtures thereof, examples of anionic substances being fatty acid taurides, fatty acid N-methyltaurides, fatty acid isethionates, alkylbenzenesulfonates, alkylnaphthalenesulfonates, alkylphenol polyglycol ether sulfates and fatty alcohol polyglycol ether sulfates; fatty acids, e.g., palmitic, stearic and oleic acid; soaps, e.g., alkali metal salts of fatty acids, naphthenic acids and resin acids, such as abietic acid, alkali-soluble resins, e.g., rosin-modified maleate resins and condensation products based on cyanuric chloride, taurine, N,N-dialkylaminoalkylamine, such as N,N-diethylaminopropylamine, and p-phenylenediamine; preference is given to resin soaps, i.e., alkali metal salts of resin acids. Examples of suitable cationic substances are quaternary ammonium salts, fatty amine ethoxylates, fatty amine polyglycol ethers, and fatty amines. Examples of suitable nonionic substances are amine oxides, fatty alcohol polyglycol ethers, fatty acid polyglycol esters, and alkylphenol polyglycol ethers.

The pigment preparations of the invention are generally solid systems of free-flowing pulverulent consistency, or granules.

The dispersing effect which can be achieved in accordance with the invention is assumed to derive from a modification of the surface structure of the base pigments by the pigment dispersants of b1) and b2). Thus in a range of cases the efficacy of the pigment dispersants of b1) and b2), and the quality of the pigment preparations produced therewith, are dependent on the point in time at which the pigment dispersants of b1) and b2) are added in the production process of the base pigment. The pigment dispersants of b1) and b2) can be added simultaneously or at different points in time or can be mixed prior to their addition.

The efficacy of the pigment dispersants of b1) and b2) may also depend on their particle size and particle morphology and on the extent of the available pigment surface. It may be advantageous to add the pigment dispersants of b1) and b2) to the base pigment only in the prospective application medium. The optimum concentration of the pigment dispersants of b1) and b2) in each case must be determined by means of preliminary guideline experiments, since the enhancement of the properties of the base pigments is not always in linear proportion to the amount of pigment dispersant.

The pigment preparations of the invention can be mixtures of one or more, preferably 1 or 2, base pigments with one or more, preferably 1 or 2, of the pigment dispersants of b1) and with or more, preferably 1 or 2, of the pigment dispersants of b2). The invention also provides a process for producing a pigment preparation of the invention, which comprises mixing the pigment dispersant(s) of b1), the pigment dispersant(s) of b2), and the base pigment(s) with one another or allowing them to act on one another at any desired point in time during their production process.

The production process of an organic pigment embraces its synthesis, possible fine division, by grinding or reprecipitation, for example, possibly a finish, and its isolation as a presscake or in the form of dry granules or powder. For example, the pigment dispersants of b1) and b2) can be added prior to or during the pigment synthesis, immediately prior to or during a fine division process or a subsequent finish. The temperatures prevailing in the course of these processes can be, for example, from 0 to 200° C. The pigment dispersants of b1) and b2) can of course also be added in portions at different times.

The addition of the pigment dispersants of b1) and b2) in the content of a fine division process takes place, for example, prior to or during the dry grinding of a crude pigment with or without additional grinding auxiliaries on a roll mill or vibratory mill, or prior to or during the wet grinding of a crude pigment in an aqueous, aqueous-organic or organic grinding medium in, for example, a bead mill. It is has also proven suitable to add the pigment dispersants of b1) and b2) before or after finishing the base pigment in an aqueous, aqueous-alkaline, aqueous-organic, or organic medium.

The pigment dispersants of b1) and b2) can also be added to the water-moist pigment presscake before drying and incorporated, in which case the pigment dispersants of b1) and b2) may themselves likewise be present as presscakes. A further possibility is to make dry mixes of powders or granules of the pigment dispersants of b1) and b2) with the powder or granules of one or more base pigments.

It is possible, furthermore, to synthesize one or more pigment dispersants of b1) and b2) and a perylene pigment as a mixture by reacting compounds of the formula (IV) and/or (VI) with an amine of the formula (VII)

$$H_2N-Z_4 \quad (VII)$$

so that the pigment preparation is obtained directly.

The pigment preparations obtainable in accordance with the present invention are notable for their outstanding coloristic and rheological properties, especially for outstanding rheology, high flocculation stability, high transparency, ready dispersibility, excellent gloss behavior, high color strength, excellent fastness to overcoating and solvents, and very good weather fastness. They are suitable for use in both solventborne and aqueous systems.

The pigment preparations produced in accordance with the invention can be used to pigment high molecular mass organic materials of natural or synthetic origin, examples being plastics, resins, varnishes, paints, electrophotographic toners and developers, and writing, drawing and printing inks.

Examples of high molecular mass organic materials which can be pigmented with said pigment preparations are cellulose ethers and cellulose esters, such as ethylcellulose, nitrocellulose, cellulose acetate or cellulose butyrate, natural resins or synthetic resins, such as addition-polymerization resins or condensation resins, e.g., amino resins, especially urea-formaldehyde and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylates, polyamides, polyurethanes or polyesters, rubber, casein, silicone, and silicone resins, individually or in mixtures.

In this context it is unimportant whether the abovementioned high molecular mass organic compounds are present in the form of plastic masses, melts, spinning solutions, varnishes, paints or printing inks. Depending on the intended use it is found advantageous to utilize the pigment preparations obtained in accordance with the invention as a blend or in the form of prepared formulations or dispersions. Based on the high molecular mass organic material to be pigmented, the pigment preparations of the invention are used in an amount of preferably from 0.05 to 30% by weight, more preferably from 0.1 to 10% by weight.

The pigment preparations of the invention are also suitable as colorants in electrophotographic toners and developers, such as one- or two-component powder toners (also called one- or two-component developers), magnetic toners, liquid toners, polymerization toners, and specialty toners (L. B. Schein, "Electrophotography and Development Physics"; Springer Series in Electrophysics 14, Springer Verlag, 2nd edition, 1992).

Typical toner binders are addition polymerization, polyaddition and polycondensation resins, such as styrene, styrene-acrylate, styrene-butadiene, acrylate, polyester, phenol-epoxy resins, polysulfones, polyurethanes, individually or in combination, and also polyethylene and polypropylene, which may include further constituents, such as charge control agents, waxes or flow assistants, or may be modified subsequently with these additives.

Furthermore, the pigment preparations of the invention are suitable as colorants in powders and powder coating materials, especially in triboelectrically or electrokinetically sprayable powder coating materials, which are used to coat the surfaces of articles made, for example, of metal, wood, plastic, glass, ceramic, concrete, textile material, paper or rubber (J. F. Hughes, "Electrostatics Powder Coating" Research Studies, John Wiley & Sons, 1984).

Typical powder coating resins employed are epoxy resins, carboxyl- and hydroxyl-containing polyester resins, polyurethane resins and acrylic resins, together with customary hardeners. Resin combinations are also used. For example, epoxy resins are frequently used in combination with carboxyl- and hydroxy-containing polyester resins. Typical hardener components (depending on the resin system) are, for example, acid anhydrides, imidazoles, and also dicyandiamide and its derivatives, blocked isocyanates, bisacylurethanes, phenolic resins and melamine resins, triglycidyl isocyanurates, oxazolines, and dicarboxylic acids.

In addition, the pigment preparations of the invention are suitable for use as colorants in ink jet inks on either an aqueous or nonaqueous basis and in those inks which operate in accordance with the hot-melt technique.

In addition, the pigment preparations of the invention are also suitable as colorants for color filters and for both additive and subtractive color generation. It is also possible for the pigment dispersants of b1) and b2) to be added to the base pigment, or vice versa, only in the application medium. The invention therefore also provides a prepared pigment formulation consisting essentially of said base pigment, said pigment dispersants of b1) and b2), said high molecular mass organic material, especially varnish, if desired, surfactants and/or further customary additives. The overall amount of base pigment plus pigment dispersants of b1) and b2) is from 0.05 to 30% by weight, preferably from 0.1 to 10% by weight, based on the overall weight of the prepared pigment formulation.

In order to evaluate the properties in the coatings sector of the pigment preparations produced in accordance with the invention, a selection was made from among the large number of known varnishes of an alkyd-melamine resin varnish (AM) containing aromatic components and based on a medium-oil alkyd resin and on a butanol-etherified melamine resin, of a polyester varnish (PE) based on cellulose acetobutyrate and a melamine resin, of a high-solids acrylic resin stoving varnish based on a nonaqueous dispersion (HS), and of a polyurethane-based aqueous varnish (PU).

The color strength and shade were determined in accordance with DIN 55986. The rheology of the millbase after dispersion (millbase rheology) was evaluated visually on the basis of the following five-point scale:

| 5 | highly fluid |
| 4 | liquid |
| 3 | viscous |
| 2 | slightly set |
| 1 | set |

Following dilution of the millbase to the final pigment concentration, the viscosity was evaluated using the Rossmann viscospatula, type 301, from Erichsen.

Gloss measurements were carried out on cast films at an angle of 20° in accordance with DIN 67530 (ASTM D 523) using the "multigloss" gloss meter from Byk-Mllinckrodt. The solvent fastness was determined in accordance with DIN 55976. The fastness to overcoating was determined in accordance with DIN 53221.

In the examples below, parts and percentages are based in each case on the weight of the substances so described.

EXAMPLE 1a

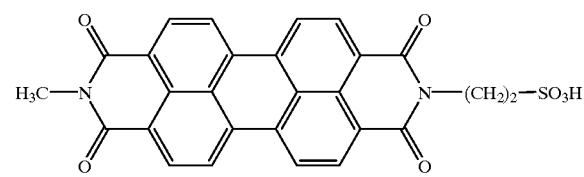

(XX)

An autoclave is charged with 1200 parts of water, and 50.1 parts of taurine are introduced and dissolved. A pH of 9.6 is established in this solution by further addition of 26.4 parts of potassium hydroxide (85% pure). Then 40.5 parts of perylene-3,4,9,10-tetracarboxylic monohydride N-monomethylimide are introduced. The mixture is heated to 150° C. and stirred at 150° C. for 3 hours. After cooling to 25° C., the reaction product, in the form of the potassium salt, is filtered off with suction, washed with water and dried at 80° C. The residue obtained is first introduced into 1000 parts of 100% strength sulfuric acid and dissolved, at 25° C. Then 850 parts of 50% strength sulfuric acid are added dropwise to this solution, the temperature being allowed to rise to up to 80° C. Subsequently, the mixture is cooled to 25° C.; the sulfonic acid which this releases is filtered off with suction, washed with 78% strength sulfuric acid, then washed free of sulfate with 31% strength hydrochloric acid, and dried at 80° C. under reduced pressure.

This gives 44.9 parts of pigment dispersant of the formula XX, containing 1.9% water, corresponding to 44.0 parts of 100% pure product (=85.9% of theory).

Analysis (taking into account 1.9% water): calc.: 63.3% C; found: 63.0% C.

EXAMPLE 1b

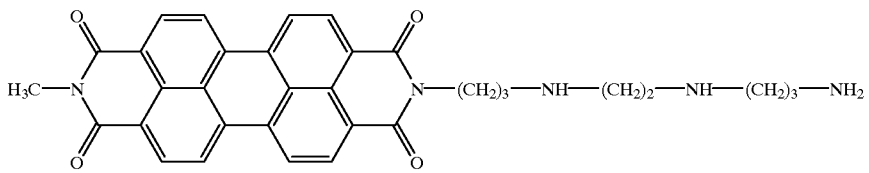

(XXI)

An autoclave is charged with 500 parts of water, 40.5 parts of perylene-3,4,9,10-tetracarboxylic monoanhydride monomethylimide are introduced, and 52.2 parts of N,N'-bis(3-aminopropyl)ethylenediamine are added. The mixture is subsequently heated to 150° C. under superatmospheric pressure and stirred at 150° C. for 5 hours. After cooling to 25° C., the pigment dispersant is filtered off with suction and washed to neutrality with water. This gives 132.2 parts of a 34.8% pure pigment dispersant presscake. A portion is dried at 80° C.

Analysis: calc.: 70.6% C; found: 71.1% C; $^1$H NMR ($D_2SO_4$): δ 8.7; 6.3; 5.7; 4.5; 4.2; 3.5; 3.2; 3.1; 2.0 ppm.

EXAMPLE 1c 10 parts of a commercially customary pigment (C.I. Pigment Red 179) prepared from perylene-3,4,9,10-tetracarboxylic dianhydride by reaction with methylamine in aqueous suspension are mixed mechanically with 0.45 part of pigment dispersant of the formula XX prepared in accordance with Example 1a and with 0.45 part of pigment dispersant of the formula XXI prepared in accordance with Example 1b. A pigment preparation is obtained which gives transparent and strongly colored coatings in the HS varnish. The rheology is evaluated as 4 to 5 and the viscosity is 3.2 s. The gloss measurement gives a value of 58. The metallic coating is strongly colored and bright.

Without the addition of the two pigment dispersants, the coatings are weaker in color and substantially more hiding. The rheology is evaluated as 1 and the viscosity is so high that it cannot be measured using the viscospatula. The gloss as well is also unmeasurable owing to the severe flocculation. The metallic coating is weakly colored and substantially less bright.

EXAMPLE 2a

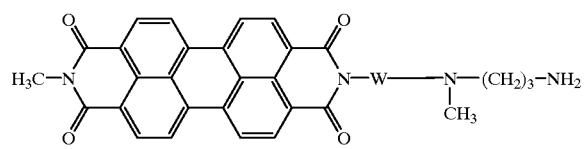

(XXII)

An autoclave is charged with 900 parts of water, 40.5 parts of perylene-3,4,9,10-tetracarboxylic monoanhydride monomethylimide are introduced, and 40.8 parts of N,N-bis(3-aminopropyl)methylamine are added. The mixture is subsequently heated to 150° C. under superatmospheric pressure and stirred at 150° C. for 5 hours. After cooling to 25° C., the pigment dispersant is filtered off with suction and washed to neutrality with water. This gives 190.3 parts of 21% pure pigment dispersant presscake. A portion is dried at 80° C.

Analysis: calc.: 72.2% C; found: 72.5% C; $^1$H NMR ($D_2SO_4$): δ 8.7; 4.2; 3.5; 3.1; 3.0; 2.8; 2.6; 2.0 ppm.

EXAMPLE 2b 30 parts of a commercially customary pigment (C.I. Pigment Red 179) prepared from perylene-3,4,9,10-tetracarboxylic dianhydride by reaction with methylamine in aqueous suspension are mixed mechanically with 1.35 parts of pigment dispersant of the formula XX prepared in accordance with Example 1a and with 1.35 parts of pigment dispersant of the formula XXII prepared in accordance with Example 2a. A pigment preparation is obtained which gives transparent, strongly colored coatings in the HS varnish. The rheology is evaluated as 4 and the viscosity is 2.8 s. The gloss measurement gives a value of 71. The metallic coating is strongly colored and bright.

BEISPIEL 3a

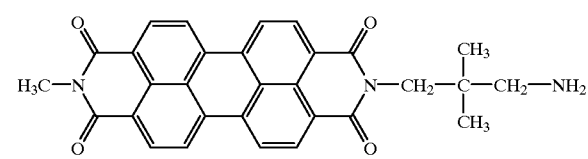

(XXIII)

An autoclave is charged with 900 parts of water, 40.5 parts of perylene-3,4,9,10-tetracarboxylic monoanhydride monomethylimide are introduced, and 40.8 parts of neopentanediamine are added. The mixture is subsequently heated to 150° C. under superatmospheric pressure and stirred at 150° C. for 5 hours. After cooling to 25° C., the pigment dispersant is filtered off with suction and washed to neutrality with water. This gives 308.1 parts of 15.1% pure pigment dispersant presscake. A portion is dried at 80° C.

Analysis: calc.: 8.6% N; found: 8.1% N; $^1$H NMR ($D_2SO_4$): δ 8.7; 3.5; 0.9 ppm.

EXAMPLE 3b 30 parts of a commercially customary pigment (C.I. Pigment Red 179) prepared from perylene-3,4,9,10-tetracarboxylic dianhydride by reaction with methylamine in aqueous suspension are mixed mechanically with 1.35 parts of pigment dispersant of the formula XX prepared in accordance with Example 1a and with 1.35 parts of pigment dispersant of the formula XXIII prepared in accordance with Example 3a.

A pigment preparation is obtained which gives transparent, strongly colored coatings in the HS varnish. The rheology is evaluated as 4 and the viscosity is 3.3 s. The gloss measurement gives a value of 70. The metallic coating is strongly colored and bright.

EXAMPLE 3c (Comparative Example: without the Acidic Dispersant)

If only the pigment dispersant of the formula XXIII, prepared in accordance with Example 3a, is mixed mechanically with the commercially customary pigment (C.I. Pigment Red 179), then the coatings are more hiding in comparison to those of Example 3b. The rheology is evaluated as 1 to 3 and the viscosity is so high that it cannot be measured using the viscospatula. The gloss as well is unmeasurable owing to the severe flocculation.

EXAMPLE 4a (XXIV)

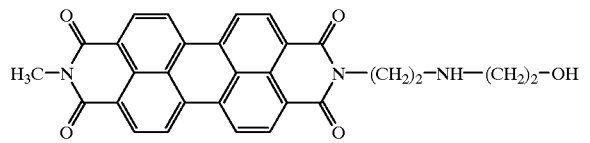

An autoclave is charged with 900 parts of water, 40.5 parts of perylene-3,4,9,10-tetracarboxylic monoanhydride monomethylimide are introduced, and 41.6 parts of N-(2-aminoethyl)ethanolamine are added. The mixture is subsequently heated to 150° C. under superatmospheric pressure and stirred at 150° C. for 5 hours. After cooling to 25° C., the pigment dispersant is filtered off with suction and washed to neutrality with water.

This gives 121.9 parts of 38.5% pure pigment dispersant presscake. A portion is dried at 80° C.

Analysis: calc.: 70.9% C; found: 71.0% C; $^1$H NMR ($D_2SO_4$): δ 8.7; 6.5; 4.5; 4.3; 3.5; 3.4; 3.3 ppm.

EXAMPLE 4b 30 parts of a commercially customary pigment (C.I. Pigment Red 179) prepared from perylene-3,4,9,10-tetracarboxylic dianhydride by reaction with methylamine in aqueous suspension are mixed mechanically with 1.35 parts of pigment dispersant of the formula XX prepared in accordance with Example 1a and with 1.35 parts of pigment dispersant of the formula XXIV prepared in accordance with Example 4a. A pigment preparation is obtained which gives transparent, strongly colored coatings in the HS varnish. The rheology is evaluated as 4 and the viscosity is 3.1 s. The gloss measurement gives a value of 47.

EXAMPLE 4c (Comparative Example: without the Acidic Dispersant)

If only the pigment dispersant of the formula XXIV, prepared in accordance with Example 4a, is mixed mechanically with the commercially customary pigment (C.I. Pigment Red 179), then the coatings are more hiding in comparison to those of Example 4b. The rheology is evaluated as 3 and the viscosity is so high that it cannot be measured using the viscospatula. The gloss as well is unmeasurable owing to the severe flocculation.

EXAMPLE 5a (XXV)

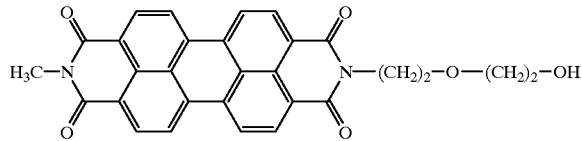

An autoclave is charged with 900 parts of water, 40.5 parts of perylene-3,4,9,10-tetracarboxylic monoanhydride monomethylimide are introduced, and 42 parts of 2-(2-aminoethoxy)ethanol are added. The mixture is subsequently heated to 150° C. under superatmospheric pressure and stirred at 150° C. for 5 hours. After cooling to 25° C., the pigment dispersant is filtered off with suction and washed to neutrality with water.

This gives 221.3 parts of 21.4% pure pigment dispersant presscake. A portion is dried at 80° C.

Analysis: calc.: 70.7% C; found: 70.5% C; $^1$H NMR ($D_2SO_4$): δ 8.7; 5.2; 4.4; 4.2; 3.5 ppm.

EXAMPLE 5b 30 parts of a commercially customary pigment (C.I. Pigment Red 179) prepared from perylene-3,4,9,10-tetracarboxylic dianhydride by reaction with methylamine in aqueous suspension are mixed mechanically with 1.35 parts of pigment dispersant of the formula XX prepared in accordance with Example 1a and with 1.35 parts of pigment dispersant of the formula XXV prepared in accordance with Example 5a. A pigment preparation is obtained which gives transparent, strongly colored coatings in the HS varnish. The rheology is evaluated as 4 and the viscosity is 5.4 s. The gloss measurement gives a value of 54.

In the PU varnish, strongly colored and transparent coatings are obtained. The metallic coating is bright. Without the addition of the two dispersants, the colorations are weaker and more hiding, and the metallic coating is not so bright.

EXAMPLE 6a (XXVI)

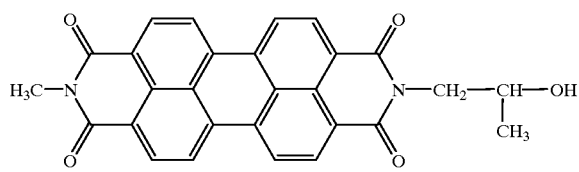

An autoclave is charged with 900 parts of water, 40.5 parts of perylene-3,4,9,10-tetracarboxylic monoanhydride monomethylimide are introduced, and 30 parts of monoisopropanolamine are added. The mixture is subsequently heated to 150° C. under superatmospheric pressure and stirred at 150° C. for 5 hours. After cooling to 25° C., the pigment dispersant is filtered off with suction and washed to neutrality with water.

This gives 117.7 parts of 38% pure pigment dispersant presscake. A portion is dried at 80° C.

Analysis: calc.: 72.7% C; found: 72.8% C; $^1$H NMR ($D_2SO_4$): δ 8.7; 5.7; 4.5; 4.0; 3.5; 1.5 ppm.

EXAMPLE 6b 10 parts of a commercially customary pigment (C.I. Pigment Red 179) prepared from perylene-3,4,9,10- tetracarboxylic dianhydride by reaction with methylamine in aqueous suspension are mixed mechanically with 0.45 part of pigment dispersant of the formula XX prepared in accordance with Example 1a and with 0.45 part of pigment dispersant of the formula XXVI prepared in accordance with Example 6a. A pigment preparation is obtained which gives transparent, strongly colored coatings in the HS varnish. The rheology is evaluated as 3.

EXAMPLE 7a

An autoclave is charged with 300 parts of water, 189.7 parts of 20.7% pure perylene-3,4,9,10-tetracarboxylic dianhydride presscake are introduced, and 104.8 parts of dipropylenetriamine are added. The mixture is subsequently heated to 150° C. under superatmospheric pressure and stirred at 150° C. for 5 hours. After cooling to 25° C., the pigment dispersant is filtered off with suction and washed to neutrality with water. This gives 435.3 parts of 12.5% pure pigment dispersant presscake. A portion is dried at 80° C.

Analysis: calc.: 69.9% C; found: 68.2% C; $^1$H NMR (D$_2$SO$_4$): δ 8.6; 6.0; 5.6; 4.1; 2.9; 2.8; 1.9; 1.8 ppm.

EXAMPLE 7b 10 parts of a commercially customary pigment (C.I. Pigment Red 179) prepared from perylene-3,4,9,10-tetracarboxylic dianhydride by reaction with methylamine in aqueous suspension are mixed mechanically with 0.45 part of pigment dispersant of the formula XX prepared in accordance with Example 1a and with 0.45 part of pigment dispersant of the formula XXVII prepared in accordance with Example 7a. A pigment preparation is obtained which gives transparent, strongly colored coatings in the HS varnish. The rheology is evaluated as 4 and the viscosity is 3.7 s. The gloss measurement gives a value of 70. The metallic coating is strongly colored and bright.

EXAMPLE 8a

An autoclave is charged with 500 parts of water, 181.9 parts of 21.5% pure perylene-3,4,9,10-tetracarboxylic dianhydride presscake are introduced, and 42 parts of 2-(2-aminoethoxy)ethanol are added. The mixture is subsequently heated to 150° C. under superatmospheric pressure and stirred at 150° C. for 5 hours. After cooling to 25° C., the pigment dispersant is filtered off with suction and washed to neutrality with water. This gives 161.7 parts of

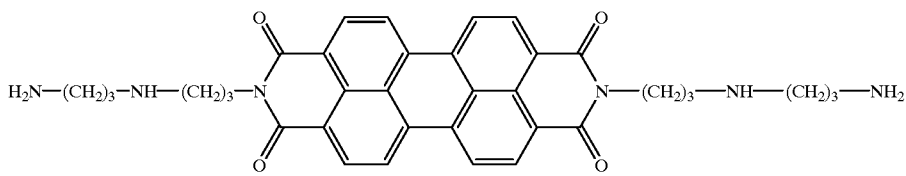

(XXVII)

38.4% pure pigment dispersant presscake. A portion is dried at 80° C.

Analysis: calc.: 67.8% C; found: 67.1% C; $^1$H NMR (D$_2$SO$_4$): δ 8.7; 5.2; 4.4; 3.7 ppm.

EXAMPLE 8b 10 parts of a commercially customary pigment (C.I. Pigment Red 179) prepared from perylene-3,4,9,10-tetracarboxylic dianhydride by reaction with methylamine in aqueous suspension are mixed mechanically with 0.45 part of pigment dispersant of the formula XX prepared in accordance with Example 1a and with 0.45 part of pigment dispersant of the formula XXVIII prepared in accordance with Example 8a. A pigment preparation is obtained which gives transparent, strongly colored coatings in the HS varnish. The rheology is evaluated as 3 to 4 and the viscosity is 9.1 s. The gloss measurement gives a value of 56. The solvent fastness of the pigment preparation is very good.

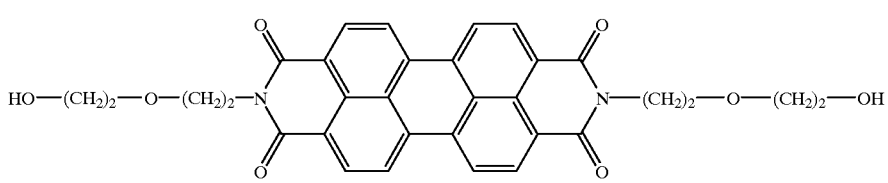

(XXVIII)

EXAMPLE 9a

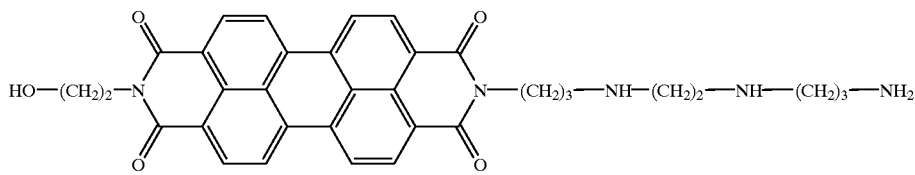
(XXIX)

An autoclave is charged with 900 parts of water, 43.5 parts of perylene-3,4,9,10-tetracarboxylic monoanhydride monohydroxyethylimide are introduced and 69.6 parts of N,N'-bis(3-aminopropyl)ethylenediamine are added. The mixture is subsequently heated to 150° C. under superatmospheric pressure and stirred at 150° C. for 5 hours. After cooling to 25° C., the pigment dispersant is filtered off with suction and washed to neutrality with water.

This gives 199.2 parts of 26.7% pure pigment dispersant presscake. A portion is dried at 80° C.

Analysis: calc.: 69.0% C; found: 69.3% C; $^1$H NMR ($D_2SO_4$): δ 8.6; 6.3; 6.2; 5.7; 5.2; 4.4; 4.2; 3.2; 3.0; 2.9; 2.8; 2.0; 1.8 ppm.

EXAMPLE 9b

A stirred vessel is charged with 500 parts of water, and 22.5 parts of perylene-3,4,9,10-tetracarboxylic dianhydride and 4.49 parts of 26.7% pure pigment dispersant presscake of the formula XXIX, prepared in accordance with Example 9a, are introduced with stirring. 2.4 parts of a commercially customary, 50%, aqueous resin soap are added to this suspension, the suspension is cooled to 0–5° C., and 40.8 parts of a 40% strength aqueous monomethylamine solution are added dropwise over 5 minutes. The mixture is stirred at 0–5° C. for a further 40 minutes. Then a solution of 12.8 parts of calcium chloride*$2H_2O$ in 42.5 parts of water is added dropwise and the mixture is stirred at 0–5° C. for 1 hour. The suspension is heated to 80° C. and stirred at 80° C. for 1 hour. Thereafter a suspension of 1.2 parts of distearyldimethylammonium chloride and 70 parts of water is added dropwise and the mixture is stirred at 80° C. for 1 hour. After cooling to 50° C., acetic acid is added dropwise at this temperature until a pH of 8.5 is reached. The resulting pigment preparation is filtered off with suction, washed free from chloride ions with water, and dried in a circulating-air oven at 80° C.

This gives 26.8 parts of pigment preparation, which is mixed mechanically with 1.14 parts of pigment dispersant of the formula XX, prepared in accordance with Example 1a, and with 1.14 parts of pigment dispersant of the formula XXIX, prepared in accordance with Example 9a.

The result is a pigment preparation which gives transparent and strongly colored coatings in the HS varnish. The rheology is evaluated as 4 to 5 and the viscosity is 2.0 s. The gloss measurement gives a value of 61. The metallic coating is strongly colored and bright.

EXAMPLE 10a

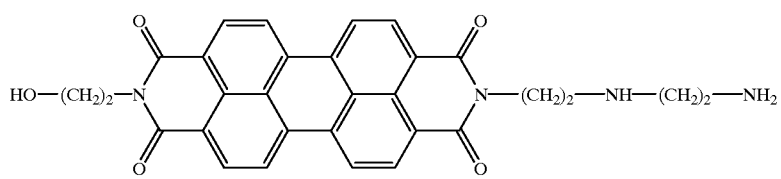
(XXX)

An autoclave is charged with 450 parts of water, 21.5 parts of perylene-3,4,9,10-tetracarboxylic monoanhydride monohydroxyethylimide are introduced, and 20.6 parts of diethylenetriamine are added. The mixture is subsequently heated to 150° C. under superatmospheric pressure and stirred at 150° C. for 5 hours. After cooling to 25° C., the pigment dispersant is filtered off with suction and washed to neutrality with water.

This gives 76.5 parts of 31.9% pure pigment dispersant presscake. A portion is dried at 80° C.

Analysis: calc.: 69.2% C; found: 70.1% C; $^1$H NMR ($D_2SO_4$): δ 8.7; 6.6; 6.5; 6.0; 5.1; 4.4; 3.4; 3.2 ppm.

EXAMPLE 10b

A pigment preparation is produced as in Example 9b, with the difference that the pigment dispersant of the formula XXX, prepared in accordance with Example 10a, is used instead of the pigment dispersant of the formula XXIX.

The result is a pigment preparation which gives transparent, strongly colored coatings in the HS varnish. The rheology is evaluated as 4 to 5 and the viscosity is 2.4 s. The gloss measurement gives a value of 61. The metallic coating is strongly colored and bright.

In the AM varnish, strongly colored and transparent coatings are obtained. The rheology is evaluated as 5 and the viscosity is 5.6 s. The gloss measurement gives a value of 79. Without the addition of the two dispersants, the colorations are weaker, the rheology is evaluated as 1 to 3, and the viscosity is so high that it cannot be measured using the viscospatula. The gloss as well is unmeasurable owing to the severe flocculation.

EXAMPLE 11a

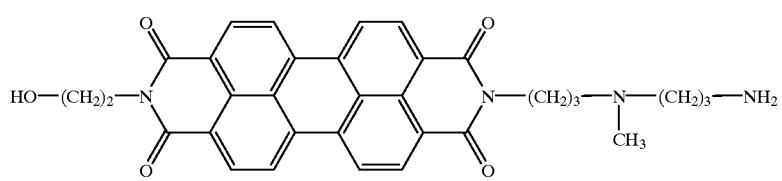

(XXXI)

An autoclave is charged with 900 parts of water, 43.5 parts of perylene-3,4,9,10-tetracarboxylic monoanhydride monohydroxyethylimide are introduced, and 40.8 parts of N,N-bis(3-aminopropyl)methylamine are added. The mixture is subsequently heated to 150° C. under superatmospheric pressure and stirred at 150° C. for 5 hours. After cooling to 25° C., the pigment dispersant is filtered off with suction and washed to neutrality with water.

This gives 136.4 parts of 37% pure pigment dispersant presscake. A portion is dried at 80° C.

Analysis: calc.: 70.5% C; found: 71.0% C; $^1$H-NMR ($D_2SO_4$): δ 8.7; 5.2; 4.4; 4.2; 2.9; 2.5; 2.0 ppm.

EXAMPLE 11b

A pigment preparation is produced as in Example 9b, with the difference that the pigment dispersant of the formula XXXI, prepared in accordance with Example 11a, is used instead of the pigment dispersant of the formula XXIX.

The result is a pigment preparation which gives transparent, strongly colored coatings in the HS varnish. The rheology is evaluated as 4 and the viscosity is 3.4 s. The gloss measurement gives a value of 59. The metallic coating is strongly colored and bright.

EXAMPLE 12a

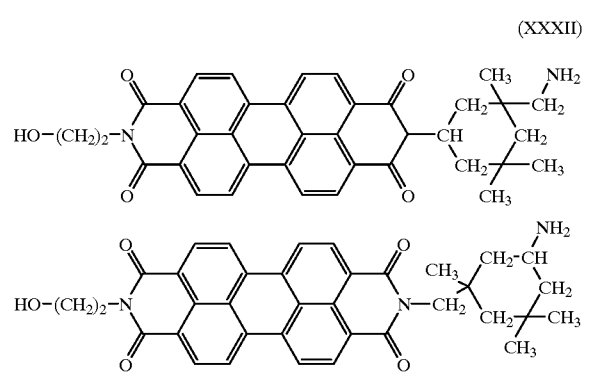

(XXXII)

An autoclave is charged with 900 parts of water, 43.5 parts of perylene-3,4,9,10-tetracarboxylic monoanhydride monohydroxyethylimide are introduced, and 68 parts of isophoronediamine are added. The mixture is subsequently heated to 150° C. under superatmospheric pressure and stirred at 150° C. for 5 hours. After cooling to 25° C., the pigment dispersant is filtered off with suction and washed to neutrality with water.

This gives 337 parts of 16.7% pure pigment dispersant presscake, which consists of a mixture in accordance with formula XXXII. A portion is dried at 80° C.

Analysis: calc.: 73.6% C; found: 72.4% C; $^1$H NMR ($D_2SO_4$): δ 8.6; 5.5; 5.4; 5.2; 4.4; 4.0; 3.2; 2.6; 2.0; 1.6; 1.4; 1.1; 0.9; 0.8; 0.7; 0.6 ppm.

EXAMPLE 12b

A pigment preparation is produced as in Example 9b, with the difference that the pigment dispersant of the formula XXXII, prepared in accordance with Example 12a, is used instead of the pigment dispersant of the formula XXIX.

The result is a pigment preparation which gives transparent, strongly colored coatings in the HS varnish. The rheology is evaluated as 4 to 5 and the viscosity is 1.5 s. The gloss measurement gives a value of 74. The metallic coating is strongly colored and bright. The solvent fastness of the pigment preparation is very good.

EXAMPLE 13a

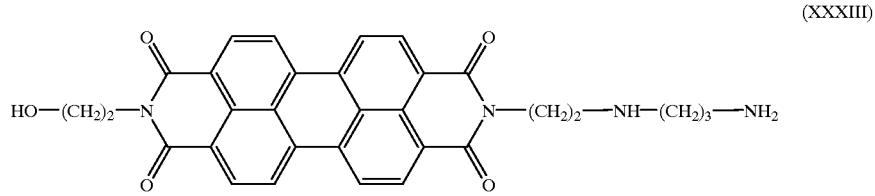

(XXXIII)

-continued

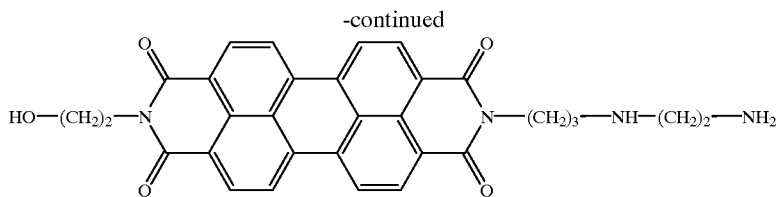

An autoclave is charged with 900 parts of water, 43.5 parts of perylene-3,4,9,10-tetracarboxylic monoanhydride monohydroxyethylimide are introduced, and 46.8 parts of 3-(2-aminoethyl)aminopropylamine are added. The mixture is subsequently heated to 150° C. under superatmospheric pressure and stirred at 150° C. for 5 hours. After cooling to 25° C., the pigment dispersant is filtered off with suction and washed to neutrality with water.

This gives 317.6 parts of 15.8% pure pigment dispersant presscake, which consists of a mixture in accordance with formula XXXIII. A portion is dried at 80° C.

Analysis: calc.: 69.7% C; found: 68.4% C; $^1$H NMR ($D_2SO_4$): δ 8.6; 6.3; 5.9; 5.7; 5.2; 4.4; 4.2; 3.3; 3.2; 3.1; 3.0; 2.8; 2.0; 1.8 ppm.

EXAMPLE 13b

A pigment preparation is produced as in Example 9b, with the difference that the pigment dispersant of the formula XXXIII, prepared in accordance with Example 13a, is used instead of the pigment dispersant of the formula XXIX.

The result is a pigment preparation which gives transparent, strongly colored coatings in the HS varnish. The rheology is evaluated as 4 and the viscosity is 2.2 s. The gloss measurement gives a value of 67. The metallic coating is strongly colored and bright. The solvent fastness of the pigment preparation is very good.

EXAMPLE 14a

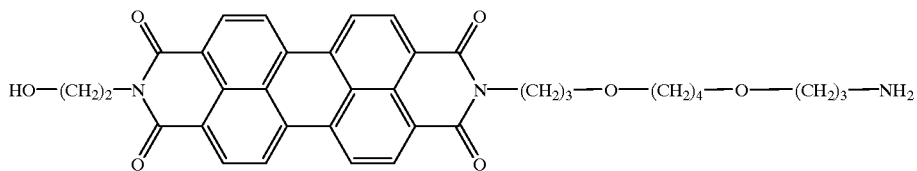

An autoclave is charged with 900 parts of water, 43.5 parts of perylene-3,4,9,10-tetracarboxylic monoanhydride monohydroxyethylimide are introduced, and 81.6 parts of 4,9-dioxadodecane-1,12-diamine are added. The mixture is subsequently heated to 150° C. under superatmospheric pressure and stirred at 150° C. for 5 hours. After cooling to 25° C., the pigment dispersant is filtered off with suction and washed to neutrality with water.

This gives 294.4 parts of 19% pure pigment dispersant presscake. A portion is dried at 80° C.

Analysis: calc.: 69.6% C; found: 69.8% C; $^1$H NMR ($D_2SO_4$): δ 8.6; 5.2; 4.7; 4.4; 4.3; 4.2; 4.1; 4.0; 2.7; 2.2; 2.0; 1.9 1.5 ppm.

EXAMPLE 14b

A pigment preparation is produced as in Example 9b, with the difference that the pigment dispersant of the formula XXXIV, prepared in accordance with Example 14a, is used instead of the pigment dispersant of the formula XXIX.

The result is a pigment preparation which gives transparent, strongly colored coatings in the HS varnish. The rheology is evaluated as 4 and the viscosity is 2.6 s. The gloss measurement gives a value of 66. The metallic coating is strongly colored and bright. The solvent fastness of the pigment preparation is very good.

EXAMPLE 15a

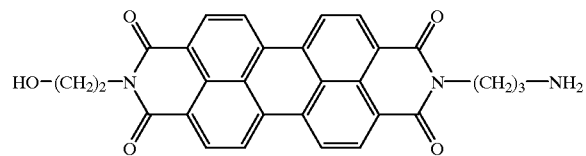

An autoclave is charged with 900 parts of water, 43.5 parts of perylene-3,4,9,10-tetracarboxylic monoanhydride monohydroxyethylimide are introduced, and 29.6 parts of 1,3-diaminopropane are added. The mixture is subsequently heated to 150° C. under superatmospheric pressure and stirred at 150° C. for 5 hours. After cooling to 25° C., the pigment dispersant is filtered off with suction and washed to neutrality with water.

This gives 391.1 parts of 10.7% pure pigment dispersant presscake. A portion is dried at 80° C.

Analysis: calc.: 8.6% N; found: 8.7% N; $^1$H NMR ($D_2SO_4$): δ 8.7; 5.2; 4.4; 4.0; 3.6; 2.8; 1.7 ppm.

EXAMPLE 15b

A pigment preparation is produced as in Example 9b, with the difference that the pigment dispersant of the formula XXXV, prepared in accordance with Example 15a, is used instead of the pigment dispersant of the formula XXIX.

The result is a pigment preparation which gives transparent, strongly colored coatings in the HS varnish. The rheology is evaluated as 4 and the viscosity is 2.8 s.

The gloss measurement gives a value of 68. The metallic coating is strongly colored and bright.

In the PU varnish, strongly colored and transparent coatings are obtained. The metallic coating is bright. Without the addition of the two dispersants, the colorations are weaker and more hiding, the metallic coating is not so bright.

EXAMPLE 16a

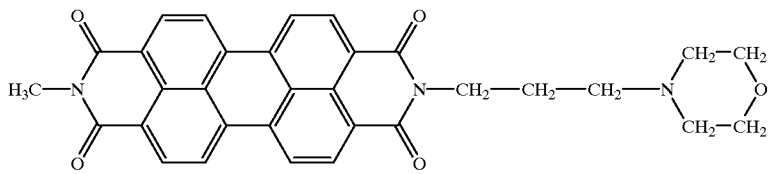

(XXXVI)

An autoclave is charged with 900 parts of water, 40.5 parts of perylene-3,4,9,10-tetracarboxylic monoanhydride monomethylimide are introduced, and 57.6 parts of N-(3-aminopropyl)morpholine are added. The mixture is subsequently heated to 150° C. under superatmospheric pressure and stirred at 150° C. for 5 hours. After cooling to 25° C., the pigment dispersant is filtered off with suction and washed to neutrality with water. This gives 330.5 parts of 16.8% pure pigment dispersant presscake. A portion is dried at 80° C.

Analysis: calc.: 7.9% N; found: 7.7% N; $^1$H NMR ($D_2SO_4$): δ 8.7; 4.2; 3.9; 3.6; 3.5; 3.2; 3.0; 2.9; 2.0 ppm.

EXAMPLE 16b 30 parts of a commercially customary pigment (C.I. Pigment Red 179) prepared from perylene-3,4,9,10-tetracarboxylic dianhydride by reaction with methylamine in aqueous suspension are mixed mechanically with 1.35 parts of pigment dispersant of the formula XX prepared in accordance with Example 1a and with 1.35 parts of pigment dispersant of the formula XXXVI prepared in accordance with Example 16a. A pigment preparation is obtained which gives transparent, strongly colored coatings in the HS varnish. The rheology is evaluated as 3.

In the PU varnish, strongly colored and transparent coatings are obtained. The metallic coating is bright. Without the addition of the two dispersants, the colorations are weaker and more hiding, and the metallic coating is not so bright.

EXAMPLE 17a

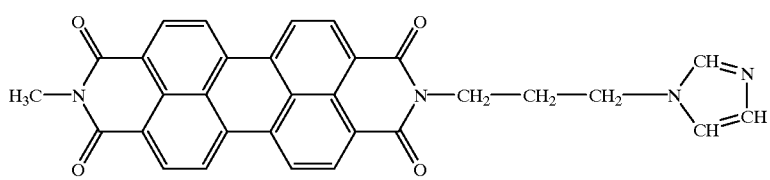

(XXXVII)

An autoclave is charged with 900 parts of water, 40.5 parts of perylene-3,4,9,10-tetracarboxylic monoanhydride monomethylimide are introduced, and 50 parts of 1-(3-aminopropyl)imidazole are added. The mixture is subsequently heated to 150° C. under superatmospheric pressure and stirred at 150° C. for 5 hours. After cooling to 25° C., the pigment dispersant is filtered off with suction and washed to neutrality with water. This gives 164 parts of 31.4% pure pigment dispersant presscake. A portion is dried at 80° C.

Analysis: calc.: 10.9% N; found: 10.9% N; $^1$H NMR ($D_2SO_4$): δ 8.7; 8.0; 7.0; 4.1; 4.0; 3.5; 2.1 ppm.

EXAMPLE 17b 30 parts of a commercially customary pigment (C.I. Pigment Red 179) prepared from perylene-3,4,9,10-tetracarboxylic dianhydride by reaction with methylamine in aqueous suspension are mixed mechanically with 1.35 parts of pigment dispersant of the formula XX prepared in accordance with Example 1a and with 1.35 parts of pigment dispersant of the formula XXXVII prepared in accordance with Example 17a. A pigment preparation is obtained which gives transparent, strongly colored coatings in the HS varnish. The rheology is evaluated as 4 to 5. The solvent fastness of the pigment preparation is very good.

EXAMPLE 18a

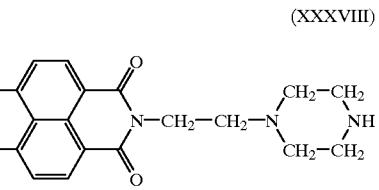

(XXXVIII)

An autoclave is charged with 900 parts of water, 40.5 parts of perylene-3,4,9,10-tetracarboxylic monoanhydride monomethylimide are introduced, and 51.6 parts of N-(2-aminoethyl)piperazine are added. The mixture is subsequently heated to 150° C. under superatmospheric pressure and stirred at 150° C. for 5 hours. After cooling to 25° C., the pigment dispersant is filtered off with suction and washed to neutrality with water. This gives 133.5 parts of 39.4% pure pigment dispersant presscake. A portion is dried at 80° C.

Analysis: calc.: 10.6% N; found: 10.3% N; $^1$H NMR ($D_2SO_4$): δ 8.7; 6.6; 6.4; 4.5; 3.8; 3.5; 3.2 ppm.

EXAMPLE 18b 30 parts of a commercially customary pigment (C.I. Pigment Red 179) prepared from perylene-3,4,9,10- tetracarboxylic dianhydride by reaction with methylamine in aqueous suspension are mixed mechanically with 1.35 parts of pigment dispersant of the formula XX prepared in accordance with Example 1a and with 1.35 parts of pigment dispersant of the formula XXXVIII prepared in accordance with Example 18a.

A pigment preparation is obtained which gives transparent, strongly colored coatings in the HS varnish. The rheology is evaluated as 4 to 5.

EXAMPLE 19a

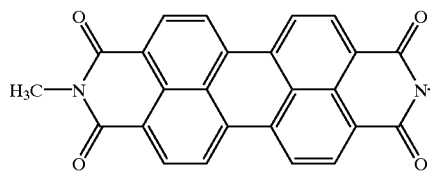
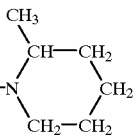

(XXXIX)

An autoclave is charged with 900 parts of water, 40.5 parts of perylene-3,4,9,10-tetracarboxylic monoanhydride monomethylimide are introduced, and 62.4 parts of 1-(3-aminopropyl)-2-pipecoline are added. The mixture is subsequently heated to 150° C. under superatmospheric pressure and stirred at 150° C. for 5 hours. After cooling to 25° C., the pigment dispersant is filtered off with suction and washed to neutrality with water.

This gives 189.8 parts of 31.1% pure pigment dispersant presscake. A portion is dried at 80° C.

Analysis: calc.: 7.7% N; found: 7.7% N; $^1$H NMR (D$_2$SO$_4$): δ 8.7; 4.1; 3.5; 3.1; 2.8; 2.5; 1.9; 1.3 ppm.

EXAMPLE 19b 30 parts of a commercially customary pigment (C.I. Pigment Red 179) prepared from perylene-3,4,9,10-tetracarboxylic dianhydride by reaction with methylamine in aqueous suspension are mixed mechanically with 1.35 parts of pigment dispersant of the formula XX prepared in accordance with Example 1a and with 1.35 parts of pigment dispersant of the formula XXXIX prepared in accordance with Example 19a. A pigment preparation is obtained which gives transparent, strongly colored coatings in the HS varnish. The rheology is evaluated as 3. The solvent fastness of the pigment preparation is very good.

EXAMPLE 20a (L)

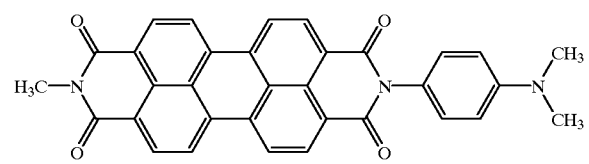

An autoclave is charged with 900 parts of water, 40.5 parts of perylene-3,4,9,10-tetracarboxylic monoanhydride monomethylimide are introduced, and 54.4 parts of N,N-dimethyl-p-phenylenediamine are added. The mixture is subsequently heated to 150° C. under superatmospheric pressure and stirred at 150° C. for 5 hours. After cooling to 25° C., the pigment dispersant is filtered off with suction and washed to neutrality with water. This gives 69.6 parts of 76.1% pure pigment dispersant presscake. A portion is dried at 80° C.

Analysis: calc.: 8.0% N; found: 8.3% N; $^1$H NMR (D$_2$SO$_4$): δ 8.7; 7.5; 7.4; 3.5; 3.0 ppm.

EXAMPLE 20b 30 parts of a commercially customary pigment (C.I. Pigment Red 179) prepared from perylene-3,4,9,10-tetracarboxylic dianhydride by reaction with methylamine in aqueous suspension are mixed mechanically with 1.35 parts of pigment dispersant of the formula XX prepared in accordance with Example 1a and with 1.35 parts of pigment dispersant of the formula L prepared in accordance with Example 20a. A pigment preparation is obtained which gives transparent, strongly colored coatings in the HS varnish. The rheology is evaluated as 3 to 4.

EXAMPLE 21a (LI)

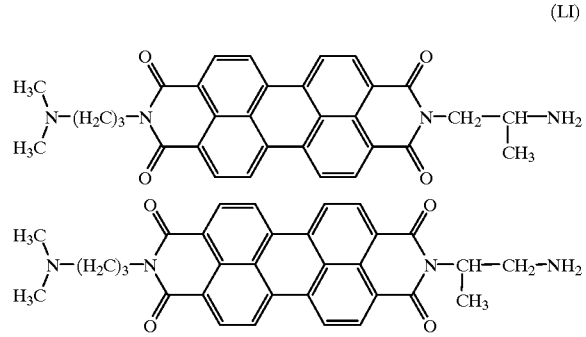

An autoclave is charged with 900 parts of water, 47.6 parts of perylene-3,4,9,10-tetracarboxylic monoanhydride mono-N,N-dimethylaminopropylimide are introduced, and 29.6 parts of 1,2-diaminopropane are added. The mixture is subsequently heated to 150° C. under superatmospheric pressure and stirred at 150° C. for 5 hours. After cooling to 25° C., the pigment dispersant is filtered off with suction and washed to neutrality with water. This gives 103.8 parts of 46% pure pigment dispersant presscake, which consists of a mixture in accordance with formula LI. A portion is dried at 80° C.

Analysis: calc.: 10.5% N; found: 10.3% N; $^1$H NMR (D$_2$SO$_4$): δ 8.7; 4.6; 4.2; 2.9; 2.5; 2.2: 1.9 ppm.

EXAMPLE 21b 30 parts of a commercially customary pigment (C.I. Pigment Red 179) prepared from perylene-3,4,9,10-tetracarboxylic dianhydride by reaction with methylamine in aqueous suspension are mixed mechanically with 1.35 parts of pigment dispersant of the formula XX prepared in accordance with Example 1a and with 1.35 parts of pigment dispersant of the formula LI prepared in accordance with Example 21a. A pigment preparation is obtained which gives transparent, strongly colored coatings in the HS varnish. The rheology is evaluated as 3 to 4.

EXAMPLE 22a

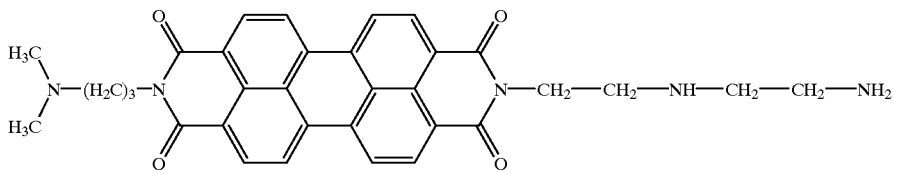

An autoclave is charged with 900 parts of water, 47.6 parts of perylene-3,4,9,10-tetracarboxylic monoanhydride mono-N,N-dimethylaminopropylimide are introduced, and 41.2 parts of diethylenetriamine are added. The mixture is subsequently heated to 150° C. under superatmospheric pressure and stirred at 150° C. for 5 hours. After cooling to 25° C., the pigment dispersant is filtered off with suction and washed to neutrality with water.

This gives 354.9 parts of 14.5% pure pigment dispersant presscake. A portion is dried at 80° C.

Analysis: calc.: 70.6% C; found: 70.2% C; $^1$H NMR (D$_2$SO$_4$): δ 8.7; 6.0; 4.4; 4.1; 3.4; 3.2; 2.9; 2.5; 2.2; 1.9 ppm.

EXAMPLE 22b 30 parts of a commercially customary pigment (C.I. Pigment Red 179) prepared from perylene-3,4,9,10-tetracarboxylic dianhydride by reaction with methylamine in aqueous suspension are mixed mechanically with 1.35 parts of pigment dispersant of the formula XX prepared in accordance with Example 1a and with 1.35 parts of pigment dispersant of the formula LII prepared in accordance with Example 22a. A pigment preparation is obtained which gives transparent, strongly colored coatings in the HS varnish. The rheology is evaluated as 4 to 5. In the PE varnish as well, strongly colored and transparent coatings are obtained.

EXAMPLE 23a

An autoclave is charged with 900 parts of water, 47.6 parts of perylene-3,4,9,10-tetracarboxylic monoanhydride mono-N,N-dimethylaminopropylimide are introduced, and 29.6 parts of 1,3-diaminopropane are added. The mixture is subsequently heated to 150° C. under superatmospheric pressure and stirred at 150° C. for 5 hours. After cooling to 25° C., the pigment dispersant is filtered off with suction and washed to neutrality with water.

(LII)

This gives 495 parts of 6.7% pure pigment dispersant presscake. A portion is dried at 80° C.

Analysis: calc.: 10.5% N; found: 10.5% N; $^1$H NMR (D$_2$SO$_4$): δ 8.7; 5.6; 4.1; 2.9; 2.8; 2.5; 1.9 ppm.

EXAMPLE 23b 30 parts of a commercially customary pigment (C.I. Pigment Red 179) prepared from perylene-3,4,9,10-tetracarboxylic dianhydride by reaction with methylamine in aqueous suspension are mixed mechanically with 1.35 parts of pigment dispersant of the formula XX prepared in accordance with Example 1a and with 1.35 parts of pigment dispersant of the formula LIII prepared in accordance with Example 23a. A pigment preparation is obtained which gives transparent, strongly colored coatings in the HS varnish. The rheology is evaluated as 4 to 5. The solvent fastness of the pigment preparation is very good.

(LIII)

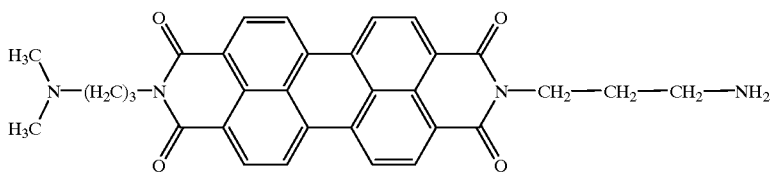

EXAMPLE 24a

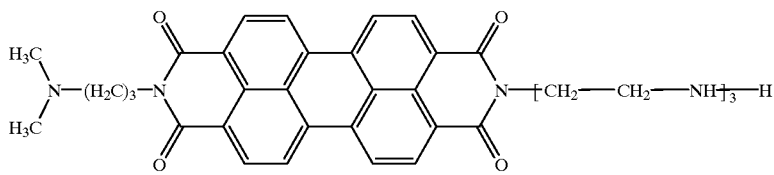

(LIV)

An autoclave is charged with 900 parts of water, 44.8 parts of perylene-3,4,9,10-tetracarboxylic monoanhydride mono-N,N-dimethylaminopropylimide are introduced, and 58.4 parts of triethylenetetramine are added. The mixture is subsequently heated to 150° C. under superatmospheric pressure and stirred at 150° C. for 5 hours. After cooling to 25° C., the pigment dispersant is filtered off with suction and washed to neutrality with water.

This gives 392.9 parts of 12.4% pure pigment dispersant presscake. A portion is dried at 80° C.

Analysis: calc.: 69.5% C; found: 69.3% C; $^1$H NMR ($D_2SO_4$): δ 8.7; 6.6; 6.0; 4.4; 4.1; 3.3; 2.9; 2.5 and 1.9 ppm.

EXAMPLE 24b 30 parts of a commercially customary pigment (C.I. Pigment Red 179) prepared from perylene-3,4,9,10-tetracarboxylic dianhydride by reaction with methylamine in aqueous suspension are mixed mechanically with 1.35 parts of pigment dispersant of the formula XX prepared in accordance with Example 1a and with 1.35 parts of pigment dispersant of the formula LIV prepared in accordance with Example 24a. A pigment preparation is obtained which gives transparent, strongly colored coatings in the HS varnish. The rheology is evaluated as 5.

EXAMPLE 25a

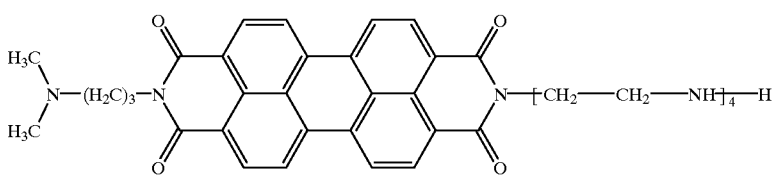

(LV)

An autoclave is charged with 900 parts of water, 44.8 parts of perylene-3,4,9,10-tetracarboxylic monoanhydride mono-N,N-dimethylaminopropy-limide are introduced, and 75.6 parts of tetraethylenepentamine are added. The mixture is subsequently heated to 150° C. under superatmospheric pressure and stirred at 150° C. for 5 hours. After cooling to 25° C., the pigment dispersant is filtered off with suction and washed to neutrality with water.

This gives 78.8 parts of 59% pure pigment dispersant presscake. A portion is dried at 80° C.

Analysis: calc.: 68.6% C; found: 68.8% C; $^1$H NMR ($D_2SO_4$): δ 8.7; 4.4; 4.1; 3.3; 2.9; 2.5 and 1.9 ppm.

EXAMPLE 25b 30 parts of a commercially customary pigment (C.I. Pigment Red 179) prepared from perylene-3,4,9,10-tetracarboxylic dianhydride by reaction with methylamine in aqueous suspension are mixed mechanically with 1.35 parts of pigment dispersant of the formula XX prepared in accordance with Example 1a and with 1.35 parts of pigment dispersant of the formula LV prepared in accordance with Example 25a. A pigment preparation is obtained which gives transparent, strongly colored coatings in the HS varnish. The rheology is evaluated as 5.

EXAMPLE 26a

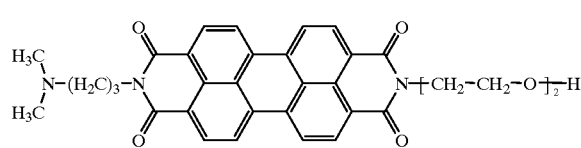

(LVI)

An autoclave is charged with 900 parts of water, 44.8 parts of perylene-3,4,9,10-tetracarboxylic monoanhydride mono-N,N-dimethylaminopropy-limide are introduced, and 42 parts of 2-(2-aminoethoxy)ethanol are added. The mixture is subsequently heated to 150° C. under superatmospheric pressure and stirred at 150° C. for 5 hours. After cooling to 25° C., the pigment dispersant is filtered off with suction and washed to neutrality with water.

This gives 129.3 parts of 37.3% pure pigment dispersant presscake. A portion is dried at 80° C.

Analysis: calc.: 7.5% N; found: 7.4% N; $^1$H NMR ($D_2SO_4$): δ 8.7; 5.2; 4.4; 4.2; 4.1; 2.9; 2.5 and 2.0 ppm.

EXAMPLE 26b 30 parts of a commercially customary pigment (C.I. Pigment Red 179) prepared from perylene-3,4,9,10-tetracarboxylic dianhydride by reaction with methylamine in aqueous suspension are mixed mechanically with 1.35 parts of pigment dispersant of the formula XX prepared in accordance with Example 1a and with 1.35 parts of pigment dispersant of the formula LVI prepared in accordance with Example 26a. A pigment preparation is obtained which gives transparent, strongly colored coatings in the HS varnish. The rheology is evaluated as 4.

In the PU varnish, strongly colored and transparent coatings are obtained. The metallic coating is bright. Without the addition of the two dispersants, the colorations are weaker and more hiding, the metallic coating is not so bright.

EXAMPLE 27a

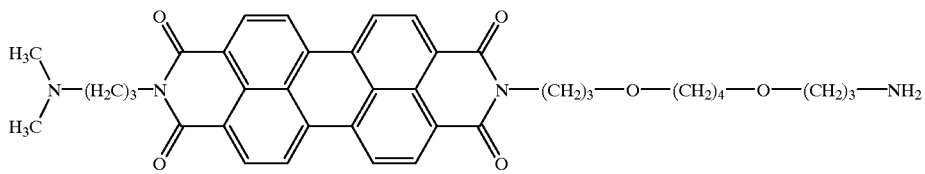

An autoclave is charged with 900 parts of water, 44.8 parts of perylene-3,4,9,10-tetracarboxylic monoanhydride mono-N,N-dimethylaminopropy-limide are introduced, and 81.6 parts of 4,9-dioxadodecane-1,12-diamine are added. The mixture is subsequently heated to 150° C. under superatmospheric pressure and stirred at 150° C. for 5 hours. After cooling to 25° C., the pigment dispersant is filtered off with suction and washed to neutrality with water.

This gives 310.3 parts of 18.6% pure pigment dispersant presscake. A portion is dried at 80° C.

Analysis: calc.: 8.5% N; found: 8.3% N; $^1$H NMR ($D_2SO_4$): δ 8.7; 4.4; 4.3; 4.1; 2.9; 2.5 and 2.0 ppm.

EXAMPLE 27b 30 parts of a commercially customary pigment (C.I. Pigment Red 179) prepared from perylene-3,4,9,10-tetracarboxylic dianhydride by reaction with methylamine in aqueous suspension are mixed mechanically with 1.35 parts of pigment dispersant of the formula XX prepared in accordance with Example 1a and with 1.35 parts of pigment dispersant of the formula LVII prepared in accordance with Example 27a. A pigment preparation is obtained which gives transparent, strongly colored coatings in the HS varnish. The rheology is evaluated as 4.

In the AM varnish, strongly colored and transparent coatings are obtained. The rheology is evaluated as 5, the viscosity is 6.4 s. The gloss measurement gives a value of 63. Without the addition of the two dispersants, the colorations are more hiding, the rheology is evaluated as 1 to 3 and the viscosity is so high that it cannot be measured using the viscospatula. The gloss as well is unmeasurable owing to the severe flocculation.

EXAMPLE 28a

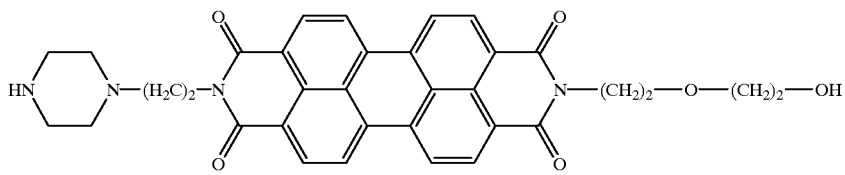

An autoclave is charged with 900 parts of water, 47.9 parts of perylene-3,4,9,10-tetracarboxylic monoanhydride mono(2-(2-hydroxyethoxy)ethyl)-imide are introduced, and 51.6 parts of N-(2-aminoethyl)piperazine are added. The mixture is subsequently heated to 150° C. under superatmospheric pressure and stirred at 150° C. for 5 hours. After cooling to 90° C., the mixture is adjusted to a pH of 8–8.5 with acetic acid and the pigment dispersant is filtered off with suction and washed to neutrality with water.

This gives 215.4 parts of 22.7% pure pigment dispersant presscake. A portion is dried at 80° C.

Analysis: calc.: 9.5% N; found: 10.0% N; $^1$H NMR spectrum ($D_2SO_4$): δ 8.7; 6.6; 6.4; 5.2; 4.4; 4.2; 3.7; 3.5; and 3.2 ppm.

EXAMPLE 28b 30 parts of a commercially customary pigment (C.I. Pigment Red 179) prepared from perylene-3,4,9,10-tetracarboxylic dianhydride by reaction with methylamine in aqueous suspension are mixed mechanically with 1.35 parts of pigment dispersant of the formula XX prepared in accordance with Example 1a and with 1.35 parts of pigment dispersant of the formula LVIII prepared in accordance with Example 28a. A pigment preparation is obtained which gives transparent, strongly colored coatings in the HS varnish. The rheology is evaluated as 4 to 5.

EXAMPLE 29a

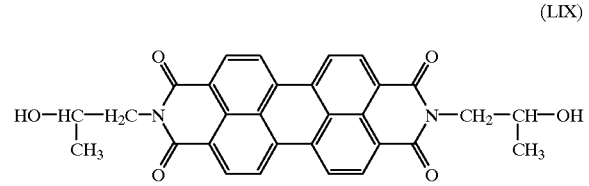

An autoclave is charged with 500 parts of water, 181.9 parts of 21.5% pure perylene-3,4,9,10-tetracarboxylic dianhydride presscake are introduced, and 30 parts of 1-amino-2-propanol are added. The mixture is subsequently heated to 150° C. under superatmospheric pressure and stirred at 150° C. for 5 hours. After cooling to 25° C., the pigment dispersant is filtered off with suction and washed to neutrality with water. This gives 139.8 parts of 35.8% pure pigment dispersant presscake. A portion is dried at 80° C.

Analysis: calc.: 5.5% N; found: 5.5% N; $^1$H NMR ($D_2SO_4$): δ 8.7; 5.7; 4.5; 4.0 and 1.5 ppm.

EXAMPLE 29b 10 parts of a commercially customary pigment (C.I. Pigment Red 179) prepared from perylene-3,4,9,10-tetracarboxylic dianhydride by reaction with methylamine in aqueous suspension are mixed mechanically with 0.45 part of pigment dispersant of the formula XX prepared in accordance with Example 1a and with 0.45 part of pigment dispersant of the formula LIX prepared in accordance with Example 29a. A pigment preparation is obtained which gives transparent, strongly colored coatings in the HS varnish. The rheology is evaluated as 4.

EXAMPLE 30a

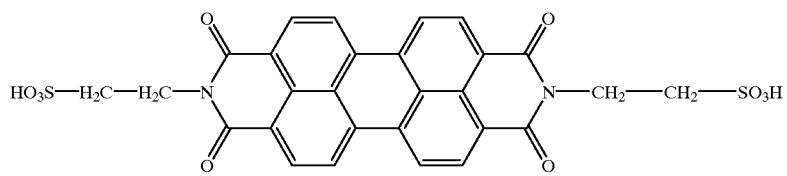

An autoclave is charged with 1000 parts of water, 184.7 parts of 21.2% pure perylene-3,4,9,10-tetracarboxylic dianhydride presscake are introduced, and 50 parts of taurine are added. A pH of 10.8 is established by adding 26.4 parts of 85% pure potassium hydroxide. The mixture is subsequently heated to 150° C. under superatmospheric pressure and stirred at 150° C. for 5 hours. After cooling to 25° C., the dipotassium salt of the disulfo acid is filtered off with suction, washed to neutrality with water and dried at 80° C. This gives 70 parts of dipotassium salt. 55.4 parts of the dipotassium salt are introduced into 1400 parts of the monohydrate of sulfuric acid. 930 parts of 50% strength sulfuric acid are added dropwise. After cooling to 25° C., the free disulfo acid is filtered off with suction over a glass frit and washed with 80% strength sulfuric acid. Washing is then carried out with 31% strength hydrochloric acid until sulfate can no longer be detected. The disulfo acid is dried under reduced pressure at 80° C.

This gives 43.7 parts of pigment dispersant.

Analysis: calc.: 10.6% N; found: 9.9% N; $^1$H NMR ($D_2SO_4$): δ 8.7; 4.6 and 3.5 ppm.

EXAMPLE 30b

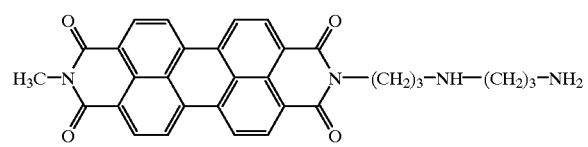

An autoclave is charged with 450 parts of water, 37 parts of perylene-3,4,9,10-tetracarboxylic monoanhydride monomethylimide are introduced, and 47.1 parts of dipropylenetriamine are added. The mixture is subsequently heated to 150° C. under superatmospheric pressure and stirred at 150° C. for 5 hours. After cooling to 25° C. and the pigment dispersant is filtered off with suction and washed to neutrality with water.

This gives 263 parts of 15.5% pure pigment dispersant presscake. A portion is dried at 80° C.

Analysis: calc.: 12.3% O; found: 13.0% O; $^1$H NMR ($D_2SO_4$): δ 8.7; 6.1; 5.7; 4.2; 3.5; 3.0; 2.8; 2.0 and 1.8 ppm.

EXAMPLE 30c 15 parts of a commercially customary pigment (C.I. Pigment Red 179) prepared from perylene-3,4,9,10-tetracarboxylic dianhydride by reaction with methylamine in aqueous suspension are mixed mechanically with 0.75 part of pigment dispersant of the formula LX prepared in accordance with Example 30a and with 0.75 part of pigment dispersant of the formula LXI prepared in accordance with Example 30b. A pigment preparation is obtained which gives transparent, strongly colored coating the HS varnish. The rheology is evaluated as 3.

EXAMPLE 31a

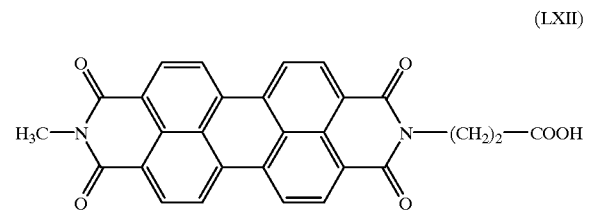

An autoclave is charged with 900 parts of water, 40.5 parts of perylene-3,4,9,10-tetracarboxylic monoanhydride monomethylimide are introduced, and 50 parts of □-alanine and 27.6 parts of 85% pure potassium hydroxide are added. The mixture is subsequently heated to 150° C. under superatmospheric pressure and stirred at 150° C. for 5 hours. After cooling to 25° C., a pH of 2 is established using 31% strength hydrochloric acid and the mixture is stirred at 90° C. for one hour. Then the solid product is filtered off with suction and washed to neutrality with water.

This gives 382.6 parts of 23.3% pure pigment dispersant presscake. A portion is dried at 80° C.

Analysis: calc.: 5.9% N; found: 5.6% N; $^1$H NMR ($D_2SO_4$): δ 8.7; 4.4, 3.5 and 3.1 ppm.

EXAMPLE 31b 30 parts of a commercially customary pigment (C.I. Pigment Red 179) prepared from perylene-3,4,9,10-tetracarboxylic dianhydride by reaction with methylamine in aqueous suspension are mixed mechanically with 1.35 parts of pigment dispersant of the formula LXII prepared in accordance with Example 31a and with 1.35 parts of pigment dispersant of the formula LXI prepared in accordance with Example 30b. A pigment preparation is obtained which gives transparent, strongly colored coatings in the HS varnish. The rheology is evaluated as 4 and the viscosity is 2.1 s. The gloss measurement gives a value of 74. The metallic coating is strongly colored and bright.

EXAMPLE 31c
(Comparative Example: without the Basic Dispersant)

If Example 31b is repeated but carrying out mechanical mixing of the pigment dispersant of the formula LXII only, as prepared in Example 31a, then in the HS varnish the rheology is evaluated only as 1 to 3 and the viscosity is so high that it cannot be measured using the viscospatula. The gloss as well is unmeasurable owing to the severe flocculation.

EXAMPLE 32c (Comparative Example: without the Basic Dispersant)

If Example 32b is repeated but carrying out mechanical mixing of just the pigment dispersant of the formula LXIII only, as prepared in Example 32a, then the coatings are more hiding than those from Example 32b, the rheology is evaluated only as 3 and the viscosity is so high that it cannot be measured using the viscospatula. The gloss as well is unmeasurable owing to the severe flocculation.

EXAMPLE 33a

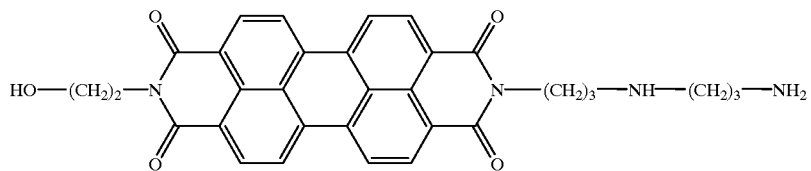

(LXIV)

EXAMPLE 32a

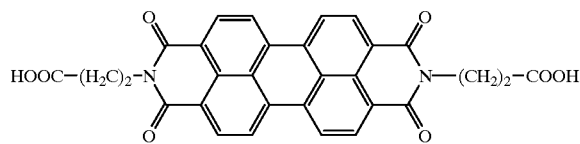

(LXIII)

An autoclave is charged with 1000 parts of water, 39.2 parts of perylene-3,4,9,10-tetracarboxylic dianhydride are introduced, 35.6 parts of □-alanine and 26.4 parts of 85% pure potassium hydroxide are added. The mixture is subsequently heated to 150° C. under superatmospheric pressure and stirred at 150° C. for 5 hours. After cooling to 25° C., a pH of 2 is established using 31% strength hydrochloric acid and the mixture is stirred at 90° C. for one hour. Then the solid product is filtered off with suction and washed to neutrality with water.

This gives 514.1 parts of 10.1% pure pigment dispersant presscake. A portion is dried at 80° C.

Analysis: calc.: 67.4% C; found: 67.4% C; $^1$H NMR ($D_2SO_4$): δ 8.7; 4.4 and 3.1 ppm.

EXAMPLE 32b 30 parts of a commercially customary pigment (C.I. Pigment Red 179) prepared from perylene-3,4,9,10-tetracarboxylic dianhydride by reaction with methylamine in aqueous suspension are mixed mechanically with 1.35 parts of pigment dispersant of the formula LXIII prepared in accordance with Example 32a and with 1.35 parts of pigment dispersant of the formula LXI prepared in accordance with Example 30b. A pigment preparation is obtained which gives transparent, strongly colored coatings in the HS varnish. The rheology is evaluated as 4 and the viscosity is 3.4 s. The gloss measurement gives a value of 72. The metallic coating is strongly colored and bright.

An autoclave is charged with 300 parts of water, 22.7 parts of perylene-3,4,9,10-tetracarboxylic monoanhydride monohydroxyethylimide are introduced, and 26.2 parts of dipropylenetriamine are added. The mixture is subsequently heated to 150° C. under superatmospheric pressure and stirred at 150° C. for 5 hours. After cooling to 25° C., the pigment dispersant is filtered off with suction and washed to neutrality with water.

This gives 143.2 parts of 19.1% pure pigment dispersant presseake. A portion is dried at 80° C.

Analysis: calc.: 70.1% C; found: 70.0% C; $^1$H NMR ($D_2SO_4$): δ 8.7; 6.1; 5.7; 5.2; 4.5; 4.2; 3.0; 2.8; 2.1 and 1.8 ppm.

EXAMPLE 33b 10 parts of a commercially customary pigment (C.I. Pigment Red 179) prepared from 1,8-naphthalimide by means of an alkaline melt with subsequent methylation are mixed mechanically with 0.5 part of pigment dispersant of the formula LXIV prepared in accordance with Example 33a and with 0.5 part of pigment dispersant of the formula XX prepared in accordance with Example 1a.

The resultant pigment preparation is used to produce a coating in the HS varnish, and a coating is also produced in the HS varnish using the commercially customary pigment (C.I. Pigment Red 179) used for the pigment preparation. A comparison of the coatings indicates that the transparency is markedly improved by the use of the pigment dispersant and the rheology is raised from 3 to 4. Without the use of the pigment dispersant, the viscosity is so high that it cannot be measured using the viscospatula; as a result of using the pigment dispersant, it is 2.3 s. The value of the gloss measurement is raised from 32 to 68.

EXAMPLE 34

10 parts of a commercially customary pigment (C.I. Pigment Red 122) are mixed mechanically with 0.15 part of pigment dispersant of the formula LIV prepared in accordance with Example 24a and with 0.15 part of pigment dispersant of the formula XX prepared in accordance with Example 1a.

The resultant pigment preparation is used to produce a coating in the AM varnish, and a coating is also produced in the AM varnish using the commercially customary pigment (C.I. Pigment Red 122) used for the pigment preparation. A comparison of the coatings indicates that the transparency is markedly improved by the use of the pigment dispersant, the color strength is increased and the rheology is raised from 3 to 5. The fastness to overcoating of the coating of the pigment preparation is excellent.

EXAMPLE 35

10 parts of a commercially customary pigment (C.I. Pigment Red 15:1) are mixed mechanically with 0.25 part of pigment dispersant of the formula XXXVIII, prepared in accordance with Example 18a, and with 0.25 part of pigment dispersant of the formula XX, prepared in accordance with Example 1a.

This gives a pigment preparation which gives transparent and strongly colored coatings in the AM varnish. The fastness to overcoating is excellent.

EXAMPLE 36

10 parts of a commercially customary pigment (C.I. Pigment Violet 19) are mixed mechanically with 0.5 part of pigment dispersant of the formula LII, prepared in accordance with Example 22a, and with 0.5 part of pigment dispersant of the formula XX, prepared in accordance with Example 1a.

This gives a pigment preparation which gives transparent and strongly colored coatings in the AM varnish. The rheology is evaluated as 5. The fastness to overcoating is excellent.

EXAMPLE 37

10 parts of a commercially customary pigment (C.I. Pigment Brown 25) are mixed mechanically with 0.25 part of pigment dispersant of the formula XXII, prepared in accordance with Example 2a, and with 0.25 part of pigment dispersant of the formula XX, prepared in accordance with Example 1a.

This gives a pigment preparation which gives transparent and strongly colored coatings in the AM varnish. The rheology is evaluated as 3.

EXAMPLE 38a
(Comparative Example against U.S. Pat. No. 4,762,569, Ex. 1)

EXAMPLE 38b
(Comparative Example)

20 parts of a commercially customary pigment (C.I. Pigment Red 179) prepared from perylene-3,4,9,10-tetracarboxylic dianhydride by reaction with methylamine in aqueous suspension are mixed mechanically with 2 parts of pigment dispersant of the formula LXV prepared in accordance with Example 38a.

In the HS varnish, the pigment preparation gives coatings which no longer cure fully on stoving.

EXAMPLE 38c
(Comparative Example)

In contrast to Example 38b, 2 parts of pigment dispersant of the formula XX, prepared in accordance with Example 1a, are mixed mechanically in addition to the 2 parts of pigment dispersant of the formula LXV prepared in accordance with Example 38a.

In the HS varnish, the pigment preparation gives strongly colored and transparent coatings which cure flawlessly on stoving.

EXAMPLE 39a

An autoclave is charged with 500 parts of water, 189.7 parts of 20.7% pure perylene-3,4,9,10-tetracarboxylic dianhydride presscake are introduced, and 52 parts of diethylaminopropylamine are added. The mixture is subsequently heated to 150° C. under superatmospheric pressure and stirred at 150° C. for 5 hours. After cooling to 25° C., the pigment dispersant is filtered off with suction and washed to neutrality with water.

This gives 138.2 parts of 45.2% pure pigment dispersant presscake of the formula LXV. A portion is dried at 80° C.

Analysis: calc.: 9.1% N; found: 9.1% N; $^1$H NMR ($D_2SO_4$): δ 8.7; 4.1; 2.8; 1.9 and 0.9 ppm.

EXAMPLE 39b 30 parts of a commercially customary pigment (C.I. Pigment Violet 29) prepared from 1,8-naphthalimide by means of an alkaline melt are mixed mechanically with 1.5 parts of pigment dispersant of the formula LXV prepared in accordance with Example 39a and with 1.5 parts of pigment dispersant of the formula XX prepared in accordance with Example 1a.

The resultant pigment preparation is used to produce a coating in the HS varnish, and a coating is also produced in the HS varnish using the commercially customary pigment (C.I. Pigment Violet 29) used for the pigment preparation. A comparison of the coatings indicates that the brightness of the metallic coating is markedly improved by the use of the

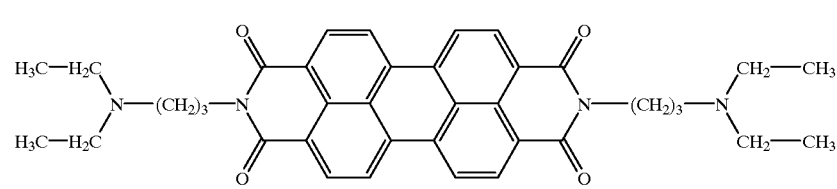

(LXV)

The pigment dispersant of the formula LXV is prepared in accordance with U.S. Pat. No. 4,762,569, Example 1.

Analysis: calc.: 9.1% N; found: 8.8% N; $^1$H NMR ($D_2SO_4$): δ 8.7; 4.1; 2.9; 2.8; 1.9 and 0.9 ppm.

pigment dispersants. Without the use of the pigment dispersants, the viscosity is so high that it cannot be measured using the viscospatula; as a result of using the pigment dispersants, it is 3.9 s. Similarly, the gloss is unmeasurable without the use of the pigment dispersants, owing to the severe flocculation; through the use of the pigment dispersants, a value of 62 is measured.

What is claimed is:
1. A pigment preparation comprising
a) from 40 to 99% by weight of at least one organic base pigment,
b1) from 1 to 40% by weight of at least one pigment dispersant of the formula (I)

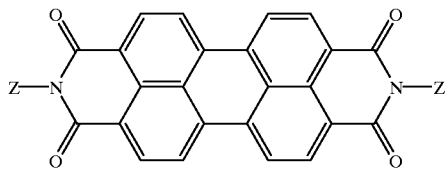
(I)

in which the two radicals Z are identical or different and Z has the definition $Z^1$, $Z^2$, $Z^3$ or $Z^4$, with the proviso that both radicals Z are not simultaneously $Z^4$, and in which
$Z^1$ is a radical of formula (Ia),

(Ia)

in which
X, $X^1$ and $X^2$ are identical or different and are a branched or unbranched $C_2$–$C_6$-alkylene radical or a $C_5$–$C_7$-cycloalkylene radical which optionally are substituted by 1 to 4 $C_1$–$C_4$-alkyl radicals, hydroxyl radicals, hydroxyalkyl radicals having 1 to 4 carbon atoms, by 1 or 2 further $C_5$–$C_7$-cycloalkyl radicals or by a combination thereof;
Y and $Y^1$ are identical or different and are an NH, —O or N($C_1$–$C_6$-alkyl) group, or

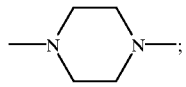

q is a number from 1 to 6;
r and s independently of one another are a number from 0 to 6, r and s not simultaneously being zero; and in which
$Z^2$ is a radical of formula (Ib),

(Ib)

in which
$q_1$ is a number from 0 to 6;
and in which
$Z^3$ is a radical of formula (Ic),

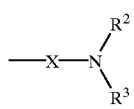
(Ic)

in which
$R^2$ and $R^3$ independently of one another are a hydrogen atom, a substituted or unsubstituted or partly fluorinated or perfluorinated alkyl group having 1 to 20 carbon atoms, or a substituted or unsubstituted or partly fluorinated or perfluorinated alkenyl group having 2 to 20 carbon atoms, wherein the substituents are hydroxyl, phenyl, cyano, chloro, bromo, $C_2$–$C_4$-acyl or $C_1$–$C_4$-alkoxy, or
$R^2$ and $R^3$ together with the nitrogen atom, form a saturated, unsaturated or aromatic heterocyclic ring with or without a further nitrogen, oxygen or sulfur atom in the ring; and
X is as defined above; and
$Z^4$ is hydrogen, hydroxyl, amino, phenyl or $C_1$–$C_{20}$-alkyl, the phenyl ring and the alkyl group optionally substituted by one or more substituents selected from the group consisting of Cl, Br, CN, OH, $C_6H_5$, carbamoyl, $C_2$–$C_4$-acyl and $C_1$–$C_4$-alkoxy and the phenyl ring also optionally substituted by $NR^2R^3$, where $R^2$ and $R^3$ are as defined above, or the alkyl group is perfluorinated or partly fluorinated; and
b2) at least one pigment dispersant of the formula (II)

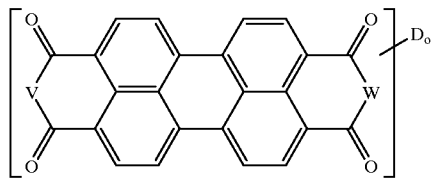
(II)

in which
V is a bivalent radical —O—, $NR^4$, or N—$R^5$—$Y^-X^+$, and
W is the bivalent radical N—$R^5$—$Y^-X^+$,
D is a chlorine or bromine atom and, if o>1, may be a combination thereof, and
o is a number from 0 to 4;
$R^4$ is a hydrogen atom or a $C_1$–$C_{20}$-alkyl group or is a phenyl group which is optionally unsubstituted or substituted one or more times, by halo, $C_1$–$C_4$-alkyl, $C_1$–$C_4$-alkoxy or phenylazo,
$R^5$ is a $C_1$–$C_{18}$-alkylene group which optionally is interrupted one or more times within the C—C-chain by a bridge member selected from the group consisting of —O—, —$NR^6$, —S—, phenylene, —CO—, —$SO_2$— and —$CR^7R^8$ and a combination thereof, in which $R^6$, $R^7$ and $R^8$ independently of one another are each a hydrogen atom or a $C_1$–$C_4$-alkyl group which is unsubstituted or substituted by a heterocyclic radical,
or is a phenylene group which is unsubstituted or substituted one or more times, by $C_1$–$C_4$-alkyl or $C_1$–$C_4$-alkoxy,
$Y^-$ is one of the anionic radicals —$SO_3^-$ or $COO^-$, and
$X^+$ is $H^+$ or the equivalent $$\frac{M^{m+}}{m}$$

of a metal cation $M^{m+}$ from main groups 1 to 5 or from transition groups 1 or 2 or 4 to 8 of the Periodic Table of the Chemical Elements, m being one of the numbers 1, 2 and 3, or defines an ammonium ion $N^+R^9R^{10}R^{11}R^{12}$, in which the substituents $R^9$, $R^{10}$, $R^{11}$ and $R^{12}$ independently of one another are each a hydrogen atom, $C_1$–$C_{30}$-alkyl, $C_1$–$C_{30}$-alkenyl, $C_5$–$C_{30}$-cycloalkyl, unsubstituted or $C_1$–$C_8$-alkyl-substituted phenyl, ($C_1$–$C_4$)-alkyl-phenyl, or are a (poly)alkyleneoxy group of the formula —[CH(R$^{80}$)—CH$_2$—O]$_k$—H in which k is a number from 1 to 30 and R$^{80}$ is hydrogen or C$_1$–C$_4$-alkyl;

and in which alkyl, alkenyl, cycloalkyl, phenyl or alkylphenyl R$^9$, R$^{10}$, R$^{11}$, R$^{12}$ are optionally further substituted by amino, hydroxyl, carboxyl or a combination thereof; or in which the substituents R$^9$ and R$^{10}$, together with the quaternary nitrogen atom, form a five- to seven-membered saturated ring system optionally comprising further heteroatoms selected from the group consisting of O, S and N;

or in which the substituents R$^9$, R$^{10}$, and R$^{11}$, together with the quaternary nitrogen atom, form a five- to seven-membered aromatic ring system optionally comprising further heteroatoms selected from the group consisting of O, S, and N and onto which additional rings are optionally fused;

with the exception of a pigment preparation comprising
an organic base pigment, a pigment dispersant of the formula (IX)

(IX)

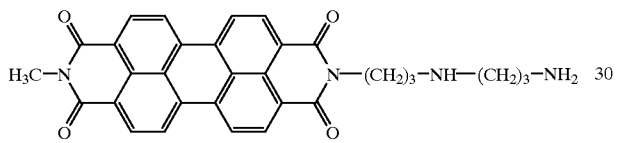

and a pigment dispersant of formula (X)

(X)

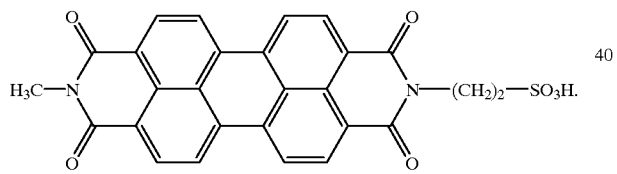

the proportions of the respective components being based on the total weight of the preparation (100% by weight).

2. The pigment preparation as claimed in claim 1 wherein X, X$^1$ and X$^2$ are C$_2$–C$_4$-alkylene or cyclohexylene.

3. The pigment preparation as claimed in claim 1, wherein Z$^1$ has one of the definitions —((CH$_2$)$_3$—NH)$_2$—H, —(CH$_2$—CH$_2$—NH)$_2$H, —(CH$_2$)$_3$—NH—(CH$_2$)$_2$—NH—(CH$_2$)$_3$—NH$_2$,

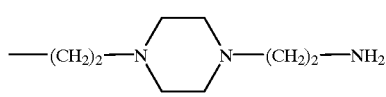

—(CH$_2$)$_3$—N(CH$_3$)—(CH$_2$)$_3$—NH$_2$, —(CH$_2$)$_3$—O—(CH$_2$)$_2$—O—(CH$_2$)$_3$—NH$_2$, —(CH$_2$)$_3$—O—(CH$_2$)$_3$—O—(CH$_2$)$_3$, —NH$_2$, —(CH$_2$)$_2$—NH—(CH$_2$)$_3$—NH$_2$, —(CH$_2$)$_3$—NH—(CH$_2$)$_2$—NH$_2$, —(CH$_2$—CH$_2$—NH)$_3$—H, —(CH$_2$—CH$_2$—NH)$_4$—H, —(CH$_2$—CH$_2$—NH)$_5$—H, —(CH$_2$)$_3$—O—(CH$_2$)$_2$—O—(CH$_2$)$_2$—O—(CH$_2$)$_3$—NH$_2$,

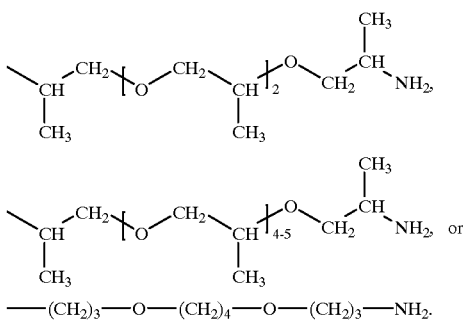

—(CH$_2$)$_3$—O—(CH$_2$)$_4$—O—(CH$_2$)$_3$—NH$_2$.

4. The pigment preparation as claimed in claim 1, wherein Z$^2$ has one of the definitions —(CH$_2$)$_2$—OH, —(CH$_2$)$_3$—OH, —CH$_2$—CH(CH$_3$)—OH, —CH(CH$_2$—CH$_3$)CH$_2$—OH, —CH(CH$_2$OH)$_2$, —(CH$_2$)$_2$—O—(CH$_2$)$_2$—OH, or —(CH$_2$)$_3$—O—(CH$_2$)$_2$—O—(CH$_2$)$_2$—OH.

5. The pigment preparation as claimed in claim 1, wherein R$^2$ and R$^3$ are identical or different and are a hydrogen atom, a C$_1$–C$_6$-alkyl group, a C$_1$–C$_6$-alkyl group substituted by 1 or 2 substituents selected from the group consisting of hydroxyl, acetyl, methoxy, ethoxy, chloro and bromo, or R$^2$ and R$^3$, together with the adjacent nitrogen atom, form an imidazolyl, piperidyl, morpholinyl, pipecolinyl, pyrrolyl, pyrrolidinyl, pyrazolyl or piperazinyl ring.

6. The pigment preparation as claimed in claim 1, wherein Z$^3$ has one of the definitions —(CH$_2$)$_2$—NH$_2$, —(CH$_2$)$_3$—NH$_2$, —CH$_2$—CH(CH$_3$)—NH$_2$,

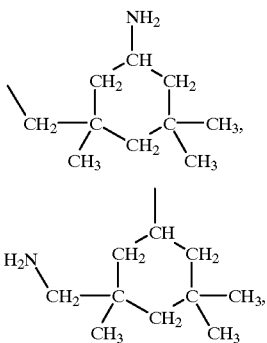

—CH$_2$—C(CH$_3$)$_2$—CH$_2$—NH$_2$, —(CH$_2$)$_2$—NH—CH$_3$, —(CH$_2$)$_2$—N(CH$_3$)$_2$, —(CH$_2$)$_2$—NH—CH$_2$—CH$_3$, —(CH$_2$)$_2$—N(CH$_2$—CH$_3$)$_2$, —(CH$_2$)$_3$—NH—CH$_3$, —(CH$_2$)$_3$—N(CH$_3$)$_2$, —(CH$_2$)$_3$—NH—CH$_2$—CH$_3$ or —(CH$_2$)$_3$—N(CH$_2$—CH$_3$)$_2$.

7. The pigment preparation as claimed in claim 1, wherein Z$^4$ is hydrogen, amino, phenyl, benzyl, NR$^2$R$^3$-substituted phenyl or benzyl, C$_1$–C$_6$-alkyl, or C$_2$–C$_6$-alkyl substituted by 1 or 2 substituents selected from the group consisting of hydroxyl, acetyl, methoxy and ethoxy.

8. The pigment preparation as claimed in claim 1, wherein Z$^4$ is hydrogen

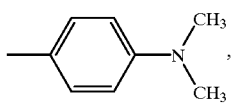

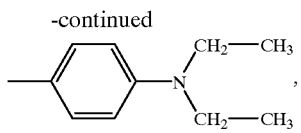

methyl, ethyl, propyl, butyl, benzyl, hydroxyethyl, hydroxypropyl or methoxypropyl.

9. The pigment preparation as claimed in claim 1, wherein $R^4$ has the definition hydrogen, $C_1$–$C_4$-alkyl or phenyl and $R^5$ has the definition $C_1$–$C_6$-alkylene.

10. The pigment preparation as claimed in claim 1, wherein said base pigment is a perylene, perinone, quinacridone, quinacridonequinone, anthraquinone, anthanthrone, benzimidazolone, disazo condensation, azo, indanthrone, phthalocyanine, triarylcarbonium, dioxazine, aminoanthraquinone, diketopyrrolopyrrol, thioindigo, isoindoline, isoindolinone, pyranthrone, isoviolanthrone or carbon black pigment.

11. The pigment preparation as claimed in claim 1, comprising
   a) from 40 to 99% by weight of at least one base pigment a),
   b) from 1 to 40% by weight of a mixture of at least one pigment dispersant b1) of the formula (I) and at least one pigment dispersant b2) of the formula (II),
   c) from 0 to 20% by weight of surfactants, and
   d) from 0 to 20% by weight of other customary additives, the proportions of the respective components being based on the total weight of the preparation (100% by weight).

12. The pigment preparation as claimed in claim 1, comprising
   a) from 60 to 98% by weight of at least one base pigment a),
   b) from 2 to 30% by weight of a mixture of at least one pigment dispersant b1) of the formula (I) and at least one pigment dispersant b2) of the formula (II),
   c) from 0.1 to 15% by weight of surfactants, and
   d) from 0.1 to 10% by weight of other customary additives, the proportions of the respective components being based on the total weight of the preparation (100% by weight).

13. A process for producing a pigment preparation as claimed in claim 1, which comprises mixing the pigment dispersants of the formulae (I) and (II) and the base pigment with one another.

14. A process for producing a pigment preparation as claimed in claim 1, which comprises adding the pigment dispersants of the formulae (I) and (II) before or after the synthesis of the base pigment; after a fine division process of the base pigment; or after a solvent treatment of the base pigment.

15. The process as claimed in claim 13, wherein the pigment dispersants and the organic base pigment are combined in the form of a water-moist presscake, or mixed with one another as dry granules or powders.

16. A process for producing a pigment preparation as claimed in claim 1, wherein the organic base pigment is a perylene pigment, the process comprising reacting perylene-3,4,9,10-tetracarboxylic monoanhydride monoimides of the formula (IV)

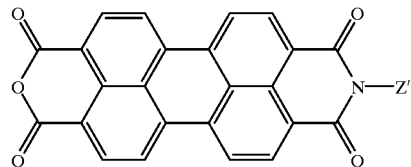

(IV)

in which Z' has the definition of Z, $R^4$ or $R^5$—$Y^-X^+$, perylene-3,4,9,10-tetracarboxylic dianhydride of formula (VI)

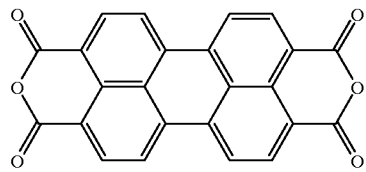

(VI)

or a mixture of the compounds of the formulae (IV) and (VI), with an amine of the formula (VII)

$$H_2N-Z^4 \qquad (VII).$$

17. A method of coloring a high molecular mass organic material, writing, drawing or printing ink, comprising the step of adding a pigment preparation as claimed in claim 1 to said high molecular mass organic material, writing, drawing or printing ink to be colored.

18. The method as claimed in claim 17, wherein a plastic, resin, varnish, paint, electrophotographic toner and developer, powder coating material, or ink jet ink is colored.

19. A prepared pigment formulation consisting essentially of a pigment preparation as claimed in claim 1, a high molecular mass organic material and optionally surfactants.

20. A prepared pigment formulation as claimed in claim 19, wherein the high molecular mass organic material is a varnish.

* * * * *